US012747364B2

(12) United States Patent
Virkar et al.

(10) Patent No.: US 12,747,364 B2
(45) Date of Patent: Sep. 29, 2026

(54) CONDUCTIVE COMPOSITES, INKS AND ADHESIVES WITH LOW SILVER NANOWIRE LOADING AND LOW RESISTIVITY, AND METHODS FOR FORMING CONDUCTIVE FEATURES

(71) Applicant: EKC Technology, Inc., Hayward, CA (US)

(72) Inventors: Ajay Virkar, San Mateo, CA (US); Amir Tork, Hayward, CA (US); Nazim Uddin, Hayward, CA (US); Ying-Syi Li, Fremont, CA (US); Xiqiang Yang, Hayward, CA (US)

(73) Assignee: EKC Technology, Inc., Hayward, CA (US)

( * ) Notice: Subject to any disclaimer, the term of this patent is extended or adjusted under 35 U.S.C. 154(b) by 0 days.

(21) Appl. No.: 19/046,856

(22) Filed: Feb. 6, 2025

(65) Prior Publication Data

US 2025/0257234 A1 Aug. 14, 2025

Related U.S. Application Data

(60) Provisional application No. 63/551,737, filed on Feb. 9, 2024.

(51) Int. Cl.
*H01B 1/22* (2006.01)
*C09D 5/24* (2006.01)
(Continued)

(52) U.S. Cl.
CPC ................ *C09D 11/52* (2013.01); *C09D 5/24* (2013.01); *C09D 11/037* (2013.01);
(Continued)

(58) Field of Classification Search
CPC ............... H01B 1/00; H01B 1/22; C09D 5/24
See application file for complete search history.

(56) References Cited

U.S. PATENT DOCUMENTS 9,183,968 B1 11/2015 Li et al.
9,447,301 B2 * 9/2016 Li .......................... B05D 1/265
(Continued)

FOREIGN PATENT DOCUMENTS

WO WO 2018/019813 A1 * 2/2018

OTHER PUBLICATIONS

Zhang et al "Silver Nanoparticles for Conductive Inks: From Synthesis and Ink Formulation to Their Use in Printing Technologies", Metals 2022, 12, 234. https://doi.org/10.3390/met12020234.*
(Continued)

*Primary Examiner* — Mark Kopec
(74) *Attorney, Agent, or Firm* — Christensen, Fonder, Dardi PLLC; Peter S. Dardi; Elizabeth A. Gallo

(57) ABSTRACT

Composite materials with good electrical conductivity at low metal loadings are prepared using flowable, curable ink compositions that include polymer matrix precursor, silver nanowires, and reducible metal ions such as silver ions. The composite materials as electrically conductive structures can include up to about 20 wt % total metal and exhibit resistivity of no more than about 500 Ohm-cm. The electrically conductive structures can be designed to exhibit a variety of performance features, for example, the structures can be opaque or translucent, or they can have a total transmittance of visible light of at least about 80%.

21 Claims, 7 Drawing Sheets

(51) Int. Cl.

| | |
|---|---|
| ***C09D 11/037*** | (2014.01) |
| ***C09D 11/101*** | (2014.01) |
| ***C09D 11/102*** | (2014.01) |
| ***C09D 11/107*** | (2014.01) |
| ***C09D 11/52*** | (2014.01) |

(52) U.S. Cl.

CPC .......... *C09D 11/101* (2013.01); *C09D 11/102* (2013.01); *C09D 11/107* (2013.01); *H01B 1/22* (2013.01)

(56) References Cited

U.S. PATENT DOCUMENTS

| | | | | |
|---|---|---|---|---|
| 9,530,534 | B2 | 12/2016 | Hu et al. | |
| 9,920,207 | B2 | 3/2018 | Virkar et al. | |
| 10,020,807 | B2 | 7/2018 | Virkar et al. | |
| 10,029,916 | B2 | 7/2018 | Virkar et al. | |
| 10,714,230 | B2 * | 7/2020 | Hu | H01B 1/02 |
| 10,734,129 | B2 | 8/2020 | Sepa et al. | |
| 10,738,212 | B2 | 8/2020 | Virkar et al. | |
| 11,773,275 | B2 | 10/2023 | Yang et al. | |
| 2011/0291032 | A1 | 12/2011 | Sun et al. | |
| 2012/0196114 | A1 | 8/2012 | Hsu et al. | |
| 2013/0224474 | A1 | 8/2013 | Theunissen et al. | |
| 2022/0298374 | A1 | 9/2022 | Griesser et al. | |
| 2023/0416552 | A1 * | 12/2023 | Yang | C09D 11/037 |
| 2024/0257991 | A1 * | 8/2024 | Yang | H01B 1/22 |
| 2024/0290516 | A1 | 8/2024 | Virkar et al. | |
| 2024/0343923 | A1 * | 10/2024 | Virkar | H01B 1/22 |
| 2025/0101238 | A1 * | 3/2025 | Virkar | C09D 5/24 |

OTHER PUBLICATIONS

Jiang et al "Low content and low-temperature cured silver nanoparticles/silver ion composite ink for flexible electronic applications with robust mechanical performance", Applied Surface Science 564 (2021) 150447.*

Lonjon te al., "Low filled conductive P (VDF-TrFE) composites: Influence of silver particles aspect ratio on percolation threshold from spheres to nanowires", Journal of Non-Crystalline Solids, vol. 358 No. 23, p. 3074-3078, (2012).

Ngyuen et al., "High conductive Ag nanowire-polyimide composites: Charge transport mechanism in thermoplastic thermostable materials", Journal of Non-Crystalline Solids, vol. 385, p. 35-39, (2014).

Park et al., "Conductive cellulose composites with low percolation threshold for 3D printed electronics", Scientific Reports, vol. 7:3246, p. 1-10, (2017).

Zhang et al., "Synergetic Effects of Silver Nanowires and Graphene Oxide on Thermal Conductivity of Epoxy Composites", Nanomaterials, vol. 9 No. 1264, p. 2-16, (2019).

International Search Report from corresponding Patent Application No. PCT/US2025/014800 dated May 27, 2025.

U.S. Appl. No. 18/980,935 to Hong et al., filed Dec. 13, 2024, entitled "High Quantity and High Yield Synthesis of Silver Nanowire With Selected Lengths and Moderate Diameters".

* cited by examiner

CONDUCTIVE COMPOSITES, INKS AND ADHESIVES WITH LOW SILVER NANOWIRE LOADING AND LOW RESISTIVITY, AND METHODS FOR FORMING CONDUCTIVE FEATURES

CROSS REFERENCE TO RELATED APPLICATIONS

This application claims priority to U.S. provisional patent application 63/551,737 filed Feb. 9, 2024 to Virkar et al., entitled “Conductive Composites, Inks and Adhesives With Low Silver Nanowire Loading and Low Resistivity, and Methods for Forming Conductive Features,” incorporated herein by reference.

FIELD OF THE INVENTION

The invention relates to metal loaded electrically conductive composite materials having a low metal loading supplied mainly by silver nanowires and, in some embodiments, reductively deposited silver, to provide surprisingly low resistivities. The invention further relates to inks and adhesives that cure to form the desirable conductive composite materials. Also, the invention relates to corresponding process methods and methods of using the conductive composites.

BACKGROUND OF THE INVENTION

The development of ever improving electronic devices and other advanced products impose increasing demands on material processing to allow for improved functionality, such as shrinking components and flexible structures. The structure of silver nanowires has brought considerable interest in the use of silver nanowires for forming transparent conductive electrodes. With respect to opaque materials, conductive composites have proven useful for simplifying processing to form conductive elements. Since silver is the most electrically conductive metal, silver flakes and silver nanoparticles have been used to form conductive composite material that are opaque, since these structures are not conducive to forming transparent materials. While these conductive composites can maintain some advantages related to polymer processing, lower values of resistivity can only be achieved using high metal loadings.

SUMMARY OF THE INVENTION

Curable ink compositions in the form of flowable blends are described. The curable ink compositions generally comprise polymer matrix precursor, silver nanowires, and reducible metal ions. Reducible metal ions comprise silver ions which may be present as a silver salt such as silver acetate, silver trifluoroacetate, silver tetrafluoroborate, silver heptafluorobutyrate or a combination thereof. The polymer matrix precursor forms a polymer matrix according to the methods described herein. For example, the polymer matrix can be formed by chemically or thermally crosslinking the precursors. Monomers used to form the polymer matrix include (meth)acrylate monomers and/or urethane (meth) acrylate monomers, (meth)acrylamide monomers, and the monomers can include one or more epoxy functional groups. The curable ink composition generally comprises at least about 72.5 wt % of the polymer matrix precursor and from about 0.25 wt % to about 25 wt % silver nanowires, both relative to the total weight of the curable ink composition. The curable ink composition generally comprises from about 5 wt % to about 50 wt % reducible metal ions relative to the weight of the silver nanowires. The curable ink compositions can comprise one or more volatile solvents, or they can be substantially free of volatile solvents.

Electrically conductive structures are also described. The electrically conductive structures comprise a composite material and can have a thickness of at least about 0.51 microns and a resistivity of no more than about 500 Ohm-cm, no more than about 100 Ohm-cm, or no more than about 1 Ohm-cm. The composite material comprises at least about 60 wt % polymer and from about 0.5 wt % to about 40 wt % silver. The silver can form a silver component that comprises silver nanowire segments and reduced silver deposits, and the silver component can be organized in a thermodynamically driven conductive network. The silver component can be formed from about 0.25 wt % to about 25 wt % silver nanowires, and from about 5 wt % to about 50 wt % reducible metal ions relative to the weight of the silver nanowires. The polymer generally comprises the polymer matrix described herein. The electrically conductive structures can be opaque or translucent, or they can have a total transmittance of visible light of at least about 80%.

Composite materials are also described. The composite materials can comprise at least about 70 wt % polymer and metal formed from curing about 1.0 wt % to about 25 wt % silver nanowires and from about 2% to about 50% reduced metal relative to weight of silver nanowires. The reduced metal can comprise silver, and the composite material can comprise no more than about 20 wt % total amount of silver. The composite material may be an adhesive and can comprise other components such as colorants.

Methods for forming electrically conductive composite materials are also described. For example, an electrically conductive composite material can be formed by curing a precursor blend of polymer matrix precursor, silver nanowires, and dissolved silver salt. The solid component of the blend can comprise from about 0.5 wt % to about 25 wt % silver nanowires, and curing can comprises reducing the silver salt to form the composite material with a resistivity of no more than about 500 Ohm-cm. The precursor blend can then be heated at a temperature and time to chemically and/or physically crosslinks the polymer matrix precursor. Heating can facilitate reduction of the dissolved silver salt to form reduced metal in the composite material. If volatile solvent is present in the precursor blend, curing can comprise removing the solvent from the blend.

DETAILED DESCRIPTION OF THE INVENTION

Figure 1:
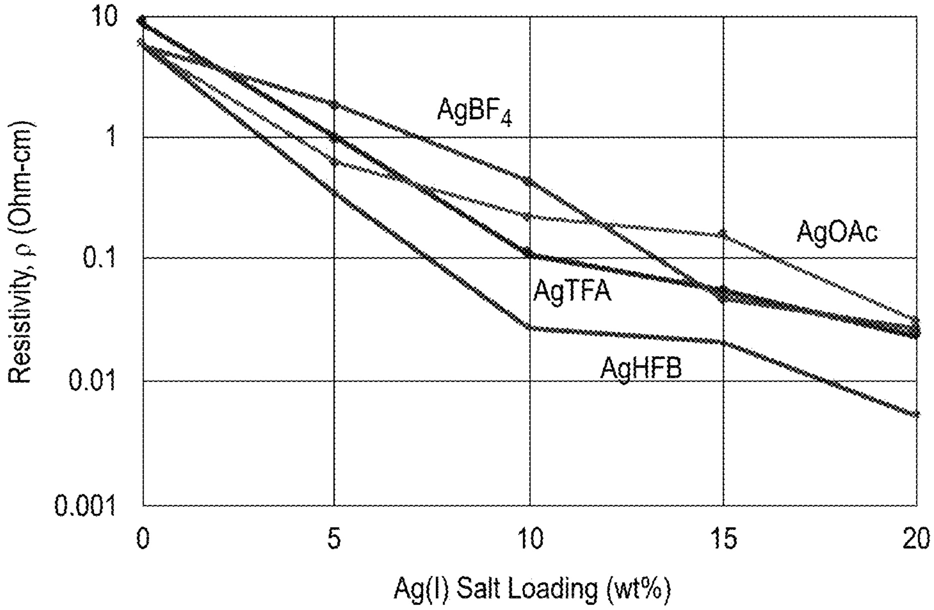
FIG. 1 is a plot of resistivity as a function of the amount of silver salt included in composites with L silver nanowires and different silver salts.

New composite materials provide good electrical conductivity at low metal loadings such that the composite materials can exhibit properties essentially corresponding to a polymer component both with respect to processing and to post deposited material, while presenting good electrical conductivity. At these lower metal loadings, the high conductivities result from the use of silver nanowires with in situ deposited metal, such as silver. This work spans a significant useful range of conductive materials between highly metal loaded compositions, low metal loading composites and transparent conductive films. Within all of these conduction domains, silver nanowires are found to provide stark improvements in electrical conductivity with different constraints on the compositions and corresponding performance. The ability to select desired domains of materials allows for coverage of a great span of properties for the final conductive materials. The present materials with low loadings can use reducible metal ions to achieve moderately high electrical conduction with materials that can have properties very close to the polymer matrix properties, which provides for great flexibility in material engineering selection. The composites are generally formed using an ink that can be deposited in an appropriate fashion. The polymer matrix can be supplied as dissolved polymer or polymer precursors in the ink, where polymer precursors can monomers, oligomers or dissolved polymers. Curing to form the polymer matrix can comprise, drying to remove solvent, polymerization, and/or crosslinking. Additionally, solid formulations without solvents can be formulated and utilized.

In contrast with the formation of transparent conductive films, and some of Applicant's previously filed patent applications in which the final metal loading in the cured composite typically exceeded 40 wt % metal, the present materials have high loadings of organics. Resulting structures are generally not highly transparent in the thickness ranges which may be of practical utility, but the structures formed with the materials generally take on the properties of the polymer matrix and, with appropriate polymer matrix selection, can still show much better optical transparency than composites made using other conventional filler technologies. Since the nanowires are relatively dilute, they may occupy a surprisingly low volume fraction, such as less than one volume percent (1.0 vol %). In situ deposited metal, generally silver provides an unexpected degree of improvement in the electrical conductivity for embodiments with appropriate silver nanowire loadings. For appropriate embodiments, the resistivity has been found to decrease more than an order of magnitude generally and in some embodiments several orders of magnitude, although as a function of the amount of reduced metal deposits, the resistivity can pass through a minimum. For higher loading of silver nanowires, the inclusion of deposited, reduced silver may not improve the electrical conduction. The mechanism of this improvement in conductivity is under exploration. Because of the low loading of metal, the composite can exhibit surprising properties, such as the ability to UV cure through a relatively thick deposit since the metal does not significantly block the UV light. The ability to have a composite with good conductivity while preserving properties of the matrix polymer opens the realm of possibilities for applications where the composite properties are significant with respect to product performance.

The present work spans between certain elements of Applicant's earlier work. In particular, the present work involves lower metal loading in the composites relative to some aspects of their earlier work. On the other hand, the present work involves high aspect ratio metal nanowires and in situ deposited silver using Nanoglue® which includes reducible metal salts and complexes. See published U.S. patent application 2024/0257991 to Yang et al. (hereinafter the '991 application), entitled "Formation of Electrically Conductive Layers at Near Ambient Temperatures Using Silver Nanoparticulate Processing and Inks for Forming the Layers." incorporated herein by reference. In contrast, very high loading of silver nanowires have been able to achieve very low resistivities using readily dispersible inks. Some of these high loading silver nanowire materials do not benefit to a large degree from the use of Nanoglue® and can be processible at room temperature. See the '991 application. In other related inventions, electrically conductive adhesives are formed with high levels of silver particulates involving a significant fraction of silver nanowires, but blended with other silver particulates, such as silver flakes and/or silver nanoparticles. These blended composite materials have somewhat higher loadings of organics than the earlier work noted above with higher amounts of silver nanowires in very high loading composites. On the other hand, the composites with significant fractions of non-nanowire silver particulates significantly benefit from the use of deposited silver metal using Nanoglue®. See copending U.S. patent application Ser. No. 18/899,760 to Virkar et al. now published U.S. patent application 2025/0101238, entitled "Silver Nanowire Based, Electrically Conductive Inks, Pastes and Electrically Conductive Polymer Composite with Metal Particulates and Corresponding Methods," incorporated herein by reference.

Previous work with conductive opaque materials have demonstrated strong concentration dependence with respect to metal loading, so that low, but useful, conductivity was observed with lower metal loadings. Applicant obtained surprisingly good electrical conductivity at low loadings with noble metal coated silver nanowires. See published U.S. patent application 2024/0290516 to Virkar et al., entitled "Silver Nanowire and Noble-Metal Coated Silver Nanowire Conductive Polymer Composites With Low Loading Percolation Conduction," incorporated herein by reference. The conventional wisdom is that very little conduction is observed until a percolation threshold is reached that effectively allows low electrical conductivity, which is a fairly abrupt transition once the filler particles (silver nanowires) are in more intimate proximity. But the electrical conductivity at the percolation threshold is still relatively low, although not insignificant. It is believed that at percolation, the dominant mode for electron transport is tunneling or hopping between adjacent NWs. At very high metal loadings, especially under conditions that tend to sinter the conductive materials, higher conduction thresholds can be reached. High loading silver pastes involving sintering processing are commercially available. At very high metal loadings, the properties of the materials are dominated or at least greatly influenced by the metallic contributions. Ranges of commercial products provide differing electrical conductivities to allow for different material properties, compatibilities and deposition methods. An entire new realm of material engineering is opened up by the materials described herein.

Applicant has achieved considerable understanding around the formation of transparent conductive films using silver nanowires. In this context, Applicant developed fusing technology allowing for the formation of unitary structures termed fused metal nanostructured networks that provide for electrical conduction directly along the structure, which can effectively reduce or eliminate any junction resistance that can greatly influence conductivity. This fusing technology is described further below. The direct electrical conduction along the fused unitary structure circumvents the need for electron percolation. The transparent structures are basically two dimensional structures involving sparse metal layers to allow for light transmission through the film. In the two dimensional transparent films, electrical resistance is dominated by junctions between the nanowires, and the two dimensional form imposes formation of many junctions due to the large aspect ratio. Three dimensional opaque material introduce different metal nanowire configurations. In higher metal loading composites, the three dimensional opaque materials again have many points of interaction between metal nanowires, and the high loadings of metal likely introduce new electrical conduction mechanisms. At low loading of metal nanowires in three dimensions, the interactions between the metal nanowires are more obscure. While not wanting to be limited by theory, similar to Applicant's work on the effectively two-dimensional transparent conductive films, the deposited metal formed from reduction of metal salts, such as silver salts, may be thermodynamically driven to particularly contribute to formation of a conductive network. The resistivity measurements though suggest such an observation as do some preliminary reliability tests which, similar to the 2D TCF case, also seem to indicate that after forming a more integrally fused structure, the conductive network is more durable. While not being limited by theory, its believed that if the silver nanowires and particles are fused or otherwise interconnected together they are less prone to increases in resistivity when subject to common industrial testing under heat and enhanced relative humidity (RH) like 85% C/85% RH as, for example, the diffusion, movement and or swelling of the organics does not physically push the NWs apart since they are connected (chemically bound together).

At higher loading levels, it seems likely that nanowires align and potentially intertwine in the materials to allow for packing. At the lower metal loading, more random silver nanowire orientations seem likely, although no detailed examination of such materials are known. With the incorporation of the reducible metal ions, composite materials with low resistivities have been demonstrated at <5 wt % silver, competitive with commercial adhesives which utilizes substantially more metal or other conductive fillers to achieve the same resistivities. The reducible metal ions can be provided using an appropriate silver composition. The silver composition should be dissolvable in whatever solvent is relevant in forming the ink. The nature of the dissolved silver compositions in the solvent is not particularly relevant as long as the silver can be reduced in the processing of the composite. The solubility provides for appropriate mixing through the ink, but especially in non-aqueous solvents, the solvated nature of the metal composition may be not straightforward. Since the silver nanowires are not agglomerated, at low loading, the formation of nanowire junctions in large number seems unlikely given the low volume fractions. In the present results, the composite samples with relatively low metal loadings have low electrical conductivity unless silver deposition using Nanoglue® is used. At the same metal loadings, the inclusion of silver salts with appropriate processing to reduce the salts results in a drop of resistance, in some embodiments by several orders of magnitude. The conductivity drop is not consistent with simply adding more metal. It is not clear if the mechanism for large resistance drop is due to similar mechanism observed for transparent conductive films where fusing forms a fused metal nanostructured network with a unitary structure, although this is a potential explanation. Given that junctions are not expected on the same dimensional scale as in two dimensional transparent conductive films, this drop in resistance seems like a remarkable result. Still, it seems reasonable to hypothesize without wanting to be limited by theory that the same general arguments in 3D persist as in the 2D case since locations of concavity have lower chemical potential are the thermodynamically preferred location of metal deposition, and the higher surface energies (or silver vs the organics) and self-similarity between the solvated metal and metal solid surfaces should all promote reduction and crystal stability at the junctions between NWs. In the present work, the reduction processes is relatively long compared to the two dimensional processing where the bulk of the reduction can be on a short time frame. While not wanting to be limited by theory, such an explanation would suggest that silver deposition preferentially takes place to improve the silver nanowire connectivity and longer fusing times can provide for longer diffusion distances for the metal ions to reach thermodynamically favored deposition locations. But as noted below, complex relationships are observed between metal loading and electrical conductivity suggesting mechanisms that are not yet understood. Also, with higher amounts of organics, it seems plausible that activation energies for diffusion are higher and general kinetics are slowed substantially compared with transparent conductive film structures, and this distinction may also explain why potentially longer times and higher temperatures may be required to achieve the lowest resistivities. Alcohol solvent can provide reduction of the metal salt upon concentration during drying, although some polymers may provide desired reducing ability.

The composite materials are formed from inks, which can be deposited using a suitable technique. The term inks is used broadly as a depositable composition suitable for depositing silver nanowires with polymer precursors and not necessarily used to imply a low viscosity. The inks generally comprise a liquid, silver nanowires and a reducible metal salt, such as a silver salt. The inks may or may not comprise volatile components, such as a solvent. In other words, the liquid of the ink or a portion thereof may or may not be volatile. The nanowire concentration can be adjusted to provide a desired loading of non-volatile components to achieve desired composite compositions following curing as well as to influence processability. Metal nanowire dispersions tend to exhibit non-Newtonian viscosity and high concentration polymer precursor materials also can independently exhibit non-Newtonian viscosity, so it can be expected that many of the composite precursor inks would have non-Newtonian behavior, although at lower metal loading, this may depend on the polymer precursors.

As explained further below, Applicant's work has involved forming well dispersed nanowires as the starting point for nanowire processing to obtain good composites. Applicant developed expertise in the formation of state of the art transparent conductive films using silver nanowires. Important experience from that technology related to the importance of using well dispersed silver nanowires at the start of processing. While not wanting to be limited by theory, the use of well dispersed nanowires allows the achievement of particulate packing based on thermodynamically favorable particle configurations that seem correspondingly conducive to forming a uniform material that then provides improved electrical conductivity. Such proposals are consistent since properly packed particles also provides for better contact between the particles to support conduction as well as lowering the mechanical free energy associated with better particle packing. Comparison with prior work supports this proposition.

To form the dispersions, a good dispersion of the silver nanowires is first formed with an appropriate solvent, such as water or an alcohol. Depending on the nature of the polymer precursors, it may or may not be desirable to maintain the original solvent. Solvent transfer can be accomplished through evaporation of the original solvent. Above a certain silver nanowire loading, the rheology changes, aggregation, dispersion quality or combinations of these prevents forming a well mixed ink. The loading limit depends on the silver nanowire aspect ratio, but loading levels have been achieved up to about 50 wt % for silver nanowire dispersions with aspect ratios that are moderate. Conversion of the ink to the ultimate composite material can involve solvent removal polymerization of polymer precursors, and/or crosslinking of the polymer precursors. If polymer precursors are liquids with suitable properties, solvent can be replaced with the polymer precursor. In other embodiments, if solvent is maintained, the solvent should be selected to be compatible with the polymer precursors. An initial solvent can be supplemented or replaced with a higher boiling point solvent as desired for processing and compatibility with polymer precursors. The amount of solvent may be selected based on rheology of the ink and suitability for a desired deposition process.

With respect to the formation of transparent conductive films, nanowires have a desirable shape that provides the ability to form a transparent material from metal while providing electrical conductivity. The one-dimensional nature of nanowires is conducive to forming sparse metal conductive layers with contacts between nanowires without blocking light transmission. Applicant's fusing development provided for the formation of a fused metal nanostructured network, which has been found to exhibit desirable electrical, optical and mechanical properties. In the fused structure, unlike the unfused structure, electrons can conduct through the network instead of hopping between separate nanowires. The one dimensional morphology of the silver nanowires seems to contribute in significant ways to the conduction properties of the discovered highly conductive materials described herein, even though the materials are not sparse or necessarily transparent. Conductivity referenced herein refers to electrical conductivity unless specifically indicated otherwise, though in some embodiments these materials may also have higher thermal conductivity properties relative to the polymer matrix and the thermal and electrical conductivities can be correlated for metal filled composites where the contribution of the electrons is a significant. Applicant also has developed AgNW based composites and coatings for thermal conductivity and transparent heating applications.

With respect to Applicant's proprietary fusing technology, it was initially discovered that halide ions can drive the fusing of metal nanowires to form transparent fused metal nanostructures. Fusing agents comprising halide anions were introduced in various ways to successfully achieve the fusing with a corresponding significant drop in the electrical resistance. It should be noted that halide ions in this processing context should not be confused with halide ions used in the nanowire synthesis reactions. Fusing of metal nanowires with halide sources is described further in U.S. Pat. No. 10,029,916 to Virkar et al., entitled "Metal Nanowire Networks and Transparent Conductive Material," and U.S. Pat. No. 9,920,207 to Virkar et al. (the '207 patent), entitled "Metal Nanostructured Networks and Transparent Conductive Material," both of which are incorporated herein by reference.

An extension of the process for forming fused metal nanowire networks was based on reduction/oxidation (redox) reactions that can be provided to result in fused nanowires without destroying the optical properties of the resulting coating. Metal for deposition at the junctions can be effectively added as a dissolved metal salt or can be dissolved from the metal nanowires themselves. The effective use of redox chemistry for fusing metal nanowires into a nanostructured network is described further in U.S. Pat. No. 10,020,807 to Virkar et al. (the '807 patent), entitled "Fused Metal Nanostructured Networks, Fusing Solutions with Reducing Agents and Methods for Forming Metal Networks," incorporated herein by reference. Single solution approaches for the formation of fused metal nanostructured layers are described further in U.S. Pat. No. 9,183,968 B1 to Li et al, (hereinafter the '968 patent) entitled "Metal Nanowire Inks for the Formation of Transparent Conductive Films with Fused Networks," incorporated herein by reference.

Applicant has synthesized very thin and uniform silver nanowires using a commercially scalable process as described in U.S. Pat. No. 10,714,230 to Hu et al., entitled "Thin and Uniform Silver Nanowires, Method of Synthesis and Transparent Conductive Films Formed From the Nanowires," incorporated herein by reference. Combined with Applicant's fusing technology, the thin nanowires can be used to form state of the art transparent conductive films with good electrical conductivity, excellent optical properties, flexibility, and good stability during use. For the formation of opaque or translucent conductive materials, good optical properties, such as low haze are not an issue, and thicker silver nanowires are cheaper to produce. Applicant has developed approaches for the synthesis of thicker nanowires, as described in published U.S. patent application 2024/0343923 to Virkar et al. (hereinafter the '923 application), entitled "High Loadings of Silver Nanowires: Dispersions and Pastes; Conductive Materials; and Corresponding Methods." incorporated herein by reference. Results in the Examples below use either relatively thin nanowires or thicker nanowires with comparable results, although both with aspect ratios over 100. Applicant has recently scaled up the synthesis of thicker silver nanowires for larger scale manufacturing, as described in copending U.S. patent application Ser. No. 18/980,935 to Hong et al. (hereinafter the '935 application), entitled "High Quantity and High Yield Synthesis of Silver Nanowire With Selected Lengths and Moderate Diameters," incorporated herein by reference.

Conductive Inks

As noted above, the inks used for depositing composite precursors comprise liquid, metal nanowires, and dissolved metal salts. Unless the liquid provides all of the precursors for the polymer matrix of the ultimate conductive composite, separate polymer precursors are also dissolved in the ink. Some additional metal components may be present in the ink. Component selection of the inks involves accounting for both the target conductive composite formed from the processing as well as processability of the ink. For embodiments of particular interest, the inks should have appropriate silver nanowire loading for formation of desired conductive composites with optional metal deposited from reduction of the silver salts, and a polymer matrix, along with optional additional additives. Reduction of the silver salts can be accomplished based on reduction agent dissolved in the liquid, reducing action by a solvent or component thereof, or by functional groups of the polymer matrix or precursor thereof. The liquid can be volatile, nonvolatile or a mixture thereof, and some liquid components can have some volatility but polymerize or crosslink prior to excessive evaporation so lower volatility components of the liquid can contribute to the polymer matrix even if somewhat volatile.

The non-volatile and/or reactive components of the ink essentially determine the composition of the composite, although the polymer may undergo changes due to polymerization and/or crosslinking and reduction of the silver salt contributes to formation of conductive pathways. In general, there are no limits on the amount of volatile solvent used in the inks, but there are practical considerations. Large amounts of solvent increase the weight and volume of the ink relative to the dimensions of the composite, energy use and cure time can be increased with greater amounts of solvent, and material stresses can result from the removal of large amounts of solvent while curing is taking place. Thus, the non-volatile components can be equated with the composite components listed below as if they are listed as components of the inks.

The inks, i.e., precursors compositions, overall generally comprise from about 55 wt % to about 99.75 wt % organic components, in some embodiments from about 65 wt % to about 99.67 wt %, in additional embodiments form about 75 wt % to about 99.50 wt %, in further embodiments from about 87.5 wt % to about 99.35 wt %, and in other embodiments from about 90 wt % to about 99.25 wt % organic components, including any volatile solvents as well as polymer matrix precursors, such as monomers, oligomers, dissolved binder polymers and/or crosslinkable resin. The non-organic components of the ink comprise primarily or predominantly silver nanowires along with reducible silver salt. Some amounts of other metal, especially silver, particulates may be present as described below. In some embodiments, the organic components can comprise from about 0 wt % to about 75 wt % volatile solvent, in further embodiments from about 10 wt % to about 65 wt % volatile solvent and in other embodiments from about 15 wt % to about 50 wt % volatile solvents. While the precursor compositions may have little volatile solvent, such as residual solvent from processing, it can be desirable in some embodiments to maintain additional volatile solvent in the precursor compositions as a process aid. Some polymer precursors can act as a non-volatile or low volatility solvent, although some polymer components of the ink can be dissolved solid polymers that rely on a solvent for incorporation into the ink. A person of ordinary skill in the art will recognize that additional ranges of component concentrations and relative weights within the explicit ranges above are contemplated and are within the present disclosure.

The remainder of the precursor compositions generally comprises metallic components. The metallic components generally comprise silver nanowires in a significant fraction relative to overall metal loading. As noted above, for these low metal loading embodiments, silver nanowires play a special role. Also, the metal components can comprise reducible silver salts. The silver salts ultimately a reduced to a metallic form as a portion of the metal conductive network in the ultimate composite, but they are dissolved in the liquids for the inks. Nevertheless, other metal shapes can be added in small amounts to modify the composite properties and can result as contaminants from the synthesis of silver nanowires. It can be costly to remove completely metal contaminants and difficult to measure lower level of contamination by small metal particulates.

The total metal contributions to the inks can comprise from about 0.25 wt % to about 45 wt %, in further embodiments from about 0.33 wt % to about 35 wt %, in other embodiments from about 0.5 wt % to about 25 wt %, in additional embodiments from about 0.65 wt % to about 12.5 wt %, and in some embodiments from about 0.75 wt % to about 10 wt %. The metal components generally comprise silver nanowires, reducible metal salts and other metal particulates, such as other silver particulate shapes. Thus, the metal components can comprise other metal particulates can be no more than about 35 wt % of non-nanowire metal components, in some embodiments no more than about 20 wt % of the metal components, in further embodiments no more than about 15 wt %, in some embodiments no more than about 10 wt % and in additional embodiments no more than about 5 wt % other metal particulates along with the silver nanowires. Contaminating silver particulates with the silver nanowires are generally at least a few weight percent, and any added metal particulates are generally added in an amount of at least one weight percent. Other metal particulates are generally silver since it has the higher electrical conductivity, but the particulates can comprise other good conductors such as copper, gold, platinum or the like. While non-nanowire particulates can generally comprise any reasonable shaped micro or nanoparticulates, such as silver flakes, silver plates, silver cubes or the like, nanoparticles can be particularly desirable due to their ability to be well dispersed through the material without disrupting a natural distribution of the nanowires with potential entanglement and interactions. The inks further comprise reducible metal ions that are reduced during curing to boost electrical conductivity. The reducible metal can comprise silver salts or other reducible metal salts, wherein the weight ratio of the metal/silver from the reducible metal (generally silver) ions to the silver nanowires is generally no more than about 50 wt % of the silver nanowires, in some embodiments from about 2.5 wt % to about 40 wt %, in further embodiments from about 5 wt % to about 30 wt % and in other embodiments from about 8 wt % to about 26 wt %. The weight of the full salt depends on the weight of the anion relative to the metal cation. Suitable silver salts include, for example, silver acetate ($Ag(O_2CCH_3)$), silver trifluoroacetate ($Ag(O_2CCF_3)$), silver heptafluorobutyrate ($Ag(O_2CC_3F_7)$), silver lactate ($Ag(O_2CCH(OH)CH_3)$), silver hexafluoroantimonate ($AgSbF_6$), silver fluoride ($AgF$), silver tetrafluoroborate ($AgBF_4$), silver nitrate ($AgNO_3$), silver perchlorate ($AgClO_4$), or mixtures thereof. Additionally, other non-silver reducible metal ions may be used (for example platinum, copper or gold based). Non-silver soluble and reducible metal salts include, for example, $HAuCl_4$, $Cu(NO_3)_2$, $Pd(NO_3)_2$, $K_2PdCl_4$, $H_2PtCl_6$, mixtures thereof or the like. The selected reducible salts should be soluble in the inks at the desired concentrations, and diluting solvent can be added, if helpful, to allow for dissolving the salt at desired amounts relative to the silver nanowires. A person of ordinary skill in the art will recognize that additional ranges of metal component concentrations and relative weights within the explicit ranges above are contemplated and are within the present disclosure.

In some embodiments, a viscous, relatively high boiling point, volatile solvent can be used, such as glycol oligomers and derivatives thereof, so that removal of the volatile solvent substantially takes place during curing. This solvent can be used not only to adjust the rheology and subsequent processing of the ink or paste but can additionally serve as an effective reducing agent to reduce metal ions and complexes. The use of higher boiling temperature solvents, e.g., greater than about 125° C., can allow a solvent to complete reduction of metal compound prior to being completely evaporated. However, while not being limited by theory, the presence of the solid metal particles can decrease the energetic barriers to nucleation and reduction and therefore heterogenous nucleation and reduction of the reducible metal compounds can occur at lower temperatures (less energy) than in isolated, or homogenous systems without solid metal particles. Therefore, even lower boiling point solvents can reduce the reducible metal compounds, but these solvents, for example ethanol or isopropanol may be too volatile for some practical applications depending on the other precursor composition constituents.

The inks can comprise polymers, resins, polymer precursors or mixtures thereof. In particular, organic constituents in the ink for the polymer matrix can comprise monomers, oligomers, dissolved binder polymers (generally solids in undissolved form), crosslinkable liquid polymers, crosslinkable resins or mixtures thereof. Liquid or solid resins, polymer, or polymer precursors generally are crosslinkable to form a solid crosslinked polymer. Polymer precursors can be oligomers, monomers or a mixture thereof, and may be dissolved in solvent or other liquid constituents. Dissolved polymers can solidify into a physically crosslinked polymer matrix for the silver nanowires. Polymerization and/or chemical crosslinking can be driven thermally, with UV radiation, by other chemical means, or any other suitable mechanism and may involve a crosslinking agent, radical initiator or other suitable agents.

A non-exhaustive list of suitable structural or binder polymers can include, for example, polyethylene terephthalate (PET), polyethylene naphthalate (PEN), polyacrylate, poly(methyl methacrylate), polyamide, polyimide, polysulfone, polysiloxane, polyester, epoxy, polyurethane, polyvinylpyrrolidone (PVP), polyvinyl alcohol, polyolefin, polyketone, polysulfone, polyvinylidene fluoride, polyvinyl acetate, silicone, siloxane, polysilane, other silicon based polymers, biopolymers, monomers and oligomers, copolymers thereof, or blends of these polymers. As used herein, the notation (meth)acrylate refers to either acrylate, methacrylate or a mixture thereof. Suitable biopolymers include, for example, polysaccharide, such as cellulose derivatives, chitosan, pectin or crosslinked starch, polypeptides, mixtures thereof and the like. Corresponding inks can comprise dissolved polymers or polymer precursors or mixtures thereof referring to possible mixtures of polymers, mixtures of polymer precursors or mixtures of polymers and precursors. Conversion of the inks into the conductive composite material can be referred to broadly as curing. The nature of the curing process depends on the nature of the precursor compositions and can comprise solvent removal, polymerization, crosslinking, combinations thereof and the like, as explained further below. As noted above, the polymer binder can be provided in the inks as monomers, oligomers, dissolved polymers, or mixtures thereof that may be subsequently further polymerized or crosslinked. Polyvinylpyrrolidone (PVP) is generally used as a capping agent during silver nanowire synthesis. Some PVP generally copurifies with the nanowires and becomes a minor component of the composite.

Suitable monomers or oligomers include, for example, acrylic type compounds such as hydroxyethyl methacrylate, hydroxyethyl acrylamide, diol or polyol type compound that is precursor of polyurethane such as tetraethylene glycol or 1,3-propylenediol, epoxy type precursors, such as DGEBA (Bisphenol A diglycidyl ether), Celloxide 2021P (Daicel U.S.A., Inc.) or YX8000D (Mitsubishi Chemical Group), radiation curable liquid adhesives, such as optical adhesive NOA 85 (Norland Products, Inc.), and combinations thereof, which may be cured through various thermal, radiation or chemical means. While solvents refer to liquid compositions, the solvents can be direct precursors for potential further processing. For example, the solvents can be monomers, or oligomers, or polymers that can polymerize and/or crosslink upon further processing, such a heating, irradiation, blending with additional reactants, drying, oxidizing, combinations thereof, or other suitable approach. Such functional solvents may or may not be used in combination with volatile solvents that are removed at a later stage such as during curing. Some of these functional solvents can be used to disperse silver nanowires. If the functional solvents have some vapor pressure, a small amount of the polymer precursors may be lost in processing, but this loss can be maintained at a low level.

The solvent, precursor compositions or a resulting polymer matrix can have hydroxyl groups or other functional groups suitable to reduce the metal species. Furthermore, reducing agents can also be added intentionally to reduce the reducible metal compositions. A range of reducing agents can be suitable, such as sugars, which should be compatible with most polymers. With respect to the relative amounts of materials in the cured material, the total weight is altered by the loss of any volatile components, and the relative amounts can then be calculated accounting for any combinations resulting from the curing process, such as total metal amounts, total organic amounts, as well as any separately identifiable constituents, as described further below.

The inks can comprise additional additives in relatively low amounts. Additives do not include components for effectuating reactions of the other components, so additives do not include metal ion reducing agents, polymer crosslinking, radical generators for polymer crosslinking, or the like, which are considered integral components. Suitable additives can be process aids, plasticizers, hardeners (copolymer constituents), stabilizers, visualization agents, other desirable components or mixtures thereof. Additives generally are selected to be suitable for incorporation from the inks into the ultimate conductive composites, but some process aids could be designed to be removed during processing, for example, due to evaporation, decomposition or other suitable means. Generally, the total amount if additives is no more than about 10 wt %, in other embodiments no more than about 5 wt % and in further embodiments from about 0.05 wt % to about 2 wt %. Individual additives generally are present in amounts of no more than about 2 wt %, in further embodiments no more than about 1 wt % and in some embodiments from about 0.01 wt % to about 0.5 wt %. Suitable process aids can include, for example, surfactants, viscosity modifiers, dispersants, mixtures thereof, or the like. Various surfactants are available commercially that are suitable for this use, such as fluorosurfactants and silicone surfactants. Suitable stabilizers can comprise polymer antioxidants, inorganic compounds to stabilize the silver nanowires (corrosion inhibitor), mixtures thereof, or the like. Silver nanowire stabilization compounds are described in U.S. Pat. No. 11,773,275 to Yang et al., entitled "Stabilized Sparse metal Conductive Films and Solutions for Delivery of Stabilizing Compounds," incorporated herein by reference. Visualization agents can include, for example, various dyes or pigments of which a larger variety are available in the polymer arts. A person of ordinary skill in the art will recognize that additional ranges of additive concentrations within the explicit ranges above are contemplated and are within the present disclosure.

The properties of the composite precursor compositions can be adjusted based on a desire delivery approach and process objectives. Thus, the precursor ink can have a consistency from a jet-able liquid to a paste. A volatile solvent can be conveniently used to adjust the viscosity, generally lowering the viscosity as the solvent is increased for appropriate solvents, to provide process adjustment without necessarily changing the cured composite properties. A corresponding metal loading adjustment can also influence the properties of the composite precursors as well as the cured composite, so a higher metal loading can increase the viscosity, and silver nanowire aspect ratio also influences viscosity with higher aspect ratios causing increases in viscosity for the same weight of metal loading. The composite precursor compositions generally, but not necessarily, exhibit non-Newtonian behavior, which is consistent with typical behaviors of polymer precursors solutions as well as more concentrated silver nanowire dispersions.

Cured Composites and Curing Process

Due to the density of the composites, observation of the microscopic structure can be challenging, especially considering the three dimensional character. Two dimensions images could be misleading. When the volume fraction of the silver nanowires is on the order of 1 percent or even less, the existence of junctions observed in two dimensional transparent conductive films would not seem to necessarily exist without the constraints of a two dimensional film, but there can be locations of relative closer approaches between nanowires. Nevertheless, the length and diameter of the nanowires provide desired connectivity over larger expanses of the composites. The results obtained with the deposited silver strongly suggest the formation of a novel structure, but the nature of the structure is presently speculative, although presumably involving non-homogeneous metal deposition at locations supportive of establishing electrically conductive pathways. The reasoning for such deposition is presently unclear, and the result is unexpected. It is not clear if the deposited metal is epitaxial with respect to the single crystal silver nanowires, although nucleation of deposition can take place favorably along the metal nanowires and, while not being limited by theory, is supported by the basic principles of nucleation and crystal growth. The formation of a fused metal nanostructured network discovered by Applicants was a new material, and it is not yet clear if the materials described herein involve in some sense a three dimensional analog of the fused metal nanostructured network, but the extension seems plausible based on the combination of electrical performance and reliability data. The results suggest a clearly new material and composite with novel properties.

With high loadings of silver particulates, the intimate contact of the metal species results in correspondingly high electrical conductivity, and improvements due to silver deposition, which may be less directed, can be less dramatic although potentially helpful. With higher loadings of silver nanowires, the nanowires presumably intertwine closely, which evidently affect electrical conductions accordingly. But at the low volume fractions considered here, such intertwining would presumably not be applicable. But the one-dimensional character (topology) of the silver nanowires may encourage some entanglement during mixing that may result in junction formation even with low volume fractions. At higher nanowire loadings, silver deposition potentially interrupts the interactions from the intertwining to reduce electrical conductivity, although again Applicant does not want to be limited by theory. Applicant's work on high loading silver nanowires results in a small effect from silver deposition, which may be improving or reducing electrical conductivity. High silver loading composites are described in the '991 application cited above.

To provide desired contributions to the electrical conductivity, generally suitable nanowires can have an average aspect ratio of at least about 25, although in some embodiments it can be desirable to use silver nanowires with an aspect ratio of at least about 100. In further embodiments, the silver nanowires can have aspect ratios from about 30 to about 3000, in further embodiments from about 50 to about 2000, and in other embodiments from about 80 to about 1500. Generally, average nanowire diameters can range from about 15 nm to about 150 nm. The silver nanowire lengths generally are at least about 5 microns, in further embodiments at least about 7 microns and in other embodiments from about 9 microns to about 100 microns. A person of ordinary skill in the art will recognize that additional ranges of aspect ratios within the explicit ranges above are contemplated and are within the present disclosure. The synthesis of thin high aspect ratio silver nanowires with a high degree of uniformity is described in U.S. Pat. No. 10,714,230 to Hu et al., entitled "Thin and Uniform Silver Nanowires, Methods of Synthesis and Transparent Conductive Films Formed From the Nanowires," incorporated herein by reference. The formation of thicker and shorter (lower aspect ratio) silver nanowires are described in the '495 application. Applicant has developed a high yield, high quantity synthesis process for the thicker silver nanowires with shorter or moderate lengths, see '935 application cited above. To have particularly robust metal nanowires that are resistance to environmental assault, silver nanowires can be formed with thin coatings of a noble metal. Applicant has developed scalable synthesis approaches, as described in U.S. Pat. No. 9,530,534B2 to Hu et al., entitled "Transparent Conductive Films," incorporated herein by reference. These noble-metal coated silver nanowires have been used similarly to silver nanowires in forming transparent conductive coatings. Platinum coated silver nanowires have been demonstrated to provide superior thermal stability, and these coated silver nanowires are suitable for use in devices such as transparent heaters. The noble metal coated silver nanowires should perform comparably to silver nanowires for forming high metal loading ECA, as described herein. The noble metal coatings should be relevant for silver nanowires of any reasonable dimensions. Coated silver nanowires, such as gold or platinum coated silver nanowires, are still considered silver nanowires for general discussions and claims herein, unless explicitly noted otherwise.

The surprisingly good electrical conductivities observed with the low metal loadings of the materials described herein are believed to rely on the use of silver nanowires, which can be combined with the in situ deposition of metal, silver in particular. Purification and synthesis of silver nanowires results in the copurification of some amounts of other silver particulates, such as nanoparticles, nanorods, nanocubes and other random shapes. In some embodiments, it may be desirable to reduce costs by performing a lower degree of purification of the metal nanowires resulting in a higher load of other silver particulate shapes as contaminants. Also, small amounts of other metal particulate shapes can be added to adjust the material properties. Nevertheless, for embodiments of particular interest herein, the dominate silver/metal particulates are silver nanowires to provide the desired low resistivity values due to low resistance electrical conduction along the nanowires without having a high metal loading overall.

Generally, the metal particulate component of the composites, comprise at least about 55 wt % silver nanowires, in other embodiments at least about 65 wt %, in additional embodiments at least about 70 wt %, in some embodiments at least about 80 wt %, in further embodiments at least about 85 wt %, in other embodiments at least about 90 wt %, and in additional embodiments at least about 95 wt % silver nanowires relative to total silver particulate weight with an upper limit being the contaminant level of the silver nanowires with respect to other silver particulates, not counting metal deposited in situ from metal/silver salts. The metal particulates can be essentially all silver nanowires such that the metal particulate contaminants provide any non-nanowire metal particulates. In the cured composite, the metal morphology generally would be expected to reflect the sources of the metal from the precursors. Thus, highly pure silver nanowires with few other silver particulates can be used. A person of ordinary skill will understand that additional ranges of silver nanowire content within the silver particulates within the explicit ranges above are contemplated and are within the present disclosure.

The exceptional improvements in conductivity is particularly observed for lower metal loading levels. At these lower metal levels, the in situ deposition of silver from salt reduction can significantly further decrease resistivity. This reduction in resistivity can be several orders of magnitude at lower metal particulate loadings. As the silver nanowire loading levels increase, resistivities decrease to low values without deposited silver, and deposited silver can then increase the electrical resistance. It is not clear why this is dramatic reversal of behavior is observed, but at least with the processing described herein, the higher silver nanowire loading evidently interferes with the formation of the conductive material resulting from the silver metal deposition or perhaps the deposited silver interferes with some collective conduction mechanisms achieved by the higher loadings of silver nanowires, although not wanting to be limited by theory. For the desired conductive composites with an overall moderate metal loading and maintenance of significant polymer properties, the conductive composite compositions generally comprise no more than about 25 wt % silver nanowires, in some embodiments no more than about 20 wt %, in additional embodiments from about 0.25 wt % to about 17 wt %, in further embodiments from about 0.30 wt % to about 14 wt %, in additional embodiments from about 0.35 wt % to about 12.5 wt % silver nanowires, and in other embodiments from about 0.5 wt % to about 10 wt % silver nanowires. After curing of the polymer and reduction of metal ions, the silver nanowires may not be separately identifiable, but the added silver nanowires inform the silver nanowire contributions carried over into the composite. As noted above, other metal, especially silver, particulates can also be added in minority amounts, and relative amounts of other metal particulates are described above and those relative amounts can be considered to also be listed here as they are directly carried over from the ink into the cured composite. A person or ordinary skill in the art will recognize that additional ranges of silver nanowire loading within the explicit ranges above are contemplated and are within the present disclosure.

The deposited silver is provided through the use of silver salts that presumably reduce during curing of the composite. The silver salts are selected to be soluble in the silver nanowire dispersion at desired concentrations. The amounts of silver salts relative to the silver nanowire weight are generally higher in comparison to the relative amounts of silver salts used in forming transparent conductive films. Results suggest that the amounts of deposited silver has an optimal value above which the resistivity can increase again, although the peak value seems dependent on the remaining composite components and concentrations. Several different silver salts have been successfully used, and optimal values seem to be salt dependent. To the extent that the solvent is changed, such as by blending or replacement, silver salt selection may be changed also to maintain solubility. Salt selection based on solubility is well within ordinary skill in the art. For the exemplified alcohol solvents, results are presented with silver trifluoroacetate (AgTFA), silver heptafluorobutyrate (AgHFB), silver tetrafluoroboate ($AgBF_4$), and silver acetate (AgOAc). Other salts may include other metals, and additional silver salts include, for example, $AgNO_3$, $AgClO_4$, AgF, mixtures of any of these salts. The solubility, diffusivity and compatibility of the metal salt with the organic components (resin system) is also another factor when selecting a desired salt. Applicant's previous results on fusing of transparent conductive films has observed different rates and process temperatures for different salts. Thus, while conventional wisdom may suggest that the salt anions are mere spectators, the results herein, as well as earlier fusing work, strongly indicate a significant influence on the thermodynamics from the anion selection, which do not seem to participate in any specific chemical reactions. The extensive results presented can be extrapolated as desired. Since the anion molecular weights can be different from each other, it can be useful to consider only the silver component of the silver salts for evaluating amounts deposited from salt reduction. It is generally assumed that all of the metal (silver) ions are reduced to metal during the processing if the processing is allowed to proceed to completion. The silver component of the silver salts can be compared to the weight of the silver nanowires. Generally, the silver contribution from the salt in the dispersion to the silver nanowire weight is from about 1 wt % to about 50 wt %, in some embodiments from about 2 wt % to about 45 wt %, in further embodiments from about 5 wt % to about 42.5 wt % and in other embodiments from about 7 wt % to about 40 wt % relative to the silver nanowire weight. A person of ordinary skill in the art will recognize that additional ranges of silver salt amounts within the explicit ranges above are contemplated and are within the present disclosure.

As noted above, the conductivity results are suggestive of the formation of electrically conductive structures in the composites. In comparison with the essentially two dimensional structure of transparent conductive films, the three dimensional composite materials seem to exhibit an even richer range of properties evidencing novel embedded structures. As the metal nanowire concentrations increase, although still at modest volume percents, electrically conductive networks seem to form, presumably due to some thermodynamically driven self-organization. These structures may be unfused in the sense that no silver salts are reduced to necessarily interconnect the structures. Actually, the results suggest that in this concentration domain, silver reduction seems to inhibit the self-assembly process, and the electrical resistivity can increase. For very high metal loadings, other mechanisms of electrical conductivity likely come into play and dramatic advantages resulting from the silver nanowire morphology may become less significant. At lower silver nanowires concentrations, the self-assembly into more conductive structures does not seem to occur at least to the degree observed at higher concentrations, and in this concentration domain, silver deposition by salt reduction can greatly reduce the resistivity. For these embodiments, the silver deposited from salt deposition seems to be thermodynamically favorable for forming a conductive network. So good electrically conductive networks are also thermodynamically favorable structures at more modest metal loading levels. So the reduction of the metal salts under thermodynamically driven conditions seems to form a novel structure providing very low resistivity for the metal loading with a random structure from the metal reduction and nanowire dispersion with thermodynamic assembly wherein the structure presumably has at least preserved section of nanowire segments, if not full nanowires and reduced metal deposits. These results are consistent with the observations related to the formation of fused metal nanostructured networks found for the transparent conductive films. The generalization of the two dimensional fusing process for the transparent films into the three dimensional domain was surprising given the significantly different topology for these materials. The further transition into a self-assembly domain for a conductive structure without metal deposition and even inhibited by metal deposition was an even greater surprise. It is believed that all of these structures are newly discovered, although their fuller characterization awaits further analysis.

Apart from the metal loading in the composite, the remaining portion of the composite can be primarily organics. In some embodiments, it may be desirable to add property modifying inorganic particles. For example, inorganic particles can be added to modify hardness, color, thermal conductivity, index of refraction or other suitable properties. Property modifying particles, especially nanoparticulates, are described further in U.S. Pat. No. 10,738,212 to Virkar et al., entitled “Property Enhancing Filler for Transparent Coatings and Transparent Conductive Films,” incorporated herein by reference. While the composites described herein may not be transparent, the same fillers can be used for introducing the same beneficial properties. Solid fillers and particles can also be introduced into the inks and composites—some examples include diamond particles, boron nitride, AlN, silicon nanoparticles and microparticles, silicon nanowires, inorganic semiconductor particles, insulating, conducting and semiconducting oxides like $SiO_2$, $TiO_2$, $ZrO_2$, indium tin oxide, indium gallium zinc oxide (IGZO), ZnO, titania, mixtures thereof and the like. Such fillers can influence the mechanical or other properties of the cured composite. In some embodiments, the composite materials can have a concentration of property enhancing particulates from about 0.01 wt % to about 10 wt %, in some embodiments from about 0.02 wt % to about 8 wt %, in further embodiments from about 0.05 wt % to about 5 wt %, and in other embodiments from about 0.1 wt % to about 3 wt %. The inks would have corresponding concentrations of the particulates adjusted for the volatile components of the ink. A person of ordinary skill in the art will recognize that additional ranges of inorganic filler concentrations within the explicit ranges above are contemplated and are within the present disclosure.

With respect to organic components, the majority of the organics generally are polymeric to form the matrix of the composite material. The polymeric components included in the ink to form the ultimate polymer matrix are described above. The composite comprises the cured polymer components, and curing is described further below. The composite matrix is generally mechanically stable with physically and/or chemically crosslinked polymers. In some embodiments, chemically crosslinked polymers are desired, and the degree of crosslinking can influence the mechanical properties of the composite, such as the hardness. The composite generally comprises from about 55 wt % to about 99.75 wt % polymer, in some embodiments from about 60 wt % to about 99.6 wt %, in additional embodiments form about 70 wt % to about 99.5 wt % polymer, in further embodiments from about 82.5 wt % to about 99.4 wt % polymer and in other embodiments form about 85 wt % to about 99.25 wt % polymer, as well as any ranges interchanging these explicit upper and lower boundaries of the ranges, such as about 70 wt % to about 99.25 wt %. A person of ordinary skill in the art will recognize that additional ranges of polymer concentration within the explicit ranges above are contemplated and are within the present disclosure.

Suitable polymers are described above in the context of inks, and the composite comprise the cured embodiments of these polymers. In particular, dissolved polymers can form solidified masses upon removal of the solvent. The solidified polymers can be physically crosslinked and/or chemically crosslinked. Monomers, oligomers and the like can polymerize during curing. The polymerization process may or may not include crosslinking of the polymers. Thus, polymerized polymers formed during curing can be physically crosslinked, chemically crosslinked or a combination thereof as a result of curing. Liquid polymers can crosslink during curing to form the cured composite material. Polymer precursor blends can result in a range of cured polymer matrices, which can comprise physically crosslinked polymers, chemically crosslinked polymers, interlinked distinct crosslinked polymers and appropriate combinations thereof. Thus, curing can be broadly viewed in terms of forming a solid polymer matrix for the resulting conductive composite.

The composites can also comprise optional non-polymer organic components. These organic components are included in the quantity of total organics noted above. These other organic compositions can include, for example, photo or thermal (e.g., radical) initiators to promote crosslinking, adhesion promoters, tackifiers, dyes, rheology modifiers, UV stabilizers, reducing agents, mixtures thereof or the like. A particular advantage of achieving higher electrical conductivity with lower amounts of metal is the ability in some embodiments to be able to achieve UV crosslinking of the polymer through a greater thickness of material. In conjunction with this, UV initiators can be desirable. In some embodiments, photocrosslinkers may form radicals upon exposure to radiation, and the radicals then induce crosslinking reactions based on radical polymerization mechanisms. Suitable photoinitiators include, for example, commercially available products, such as IRGACURE® brand (BASF), GENOCURE™ brand (Rahn USA Corp.), Omnirad 2022 (iGM Resin), and DOUBLECURE® brand (Double Bond Chemical Ind., Co, Ltd.), combinations thereof or the like. Radical thermal initiators are commercially available, such as those based on peroxide or nitrile chemistries. The composite can comprise a total of optional non-polymeric organic component(s) generally no more than about 30 wt %, in some embodiments from about 0.1 wt % to about 25 wt %, in additional embodiments from about 0.25 wt % to about 20 wt %, in further embodiments from about 0.5 wt % to about 15 wt %, and in some embodiments from about 0.75 wt % to about 10 wt %. These total amounts of non-polymer organics can be distributed among one or a plurality of components as desired to achieved target properties of the composite. A person or ordinary skill in the art will recognize that additional ranges of total non-polymer organic components within the explicit ranges above are contemplated and are within the present disclosure.

As noted above, the processing involves the formation of a good silver nanowire dispersion. Applicant has developed the ability to form more concentrated silver nanowire dispersions that are well dispersed. As the silver nanowire concentration increases, the rheology of the dispersions changes and the dispersion can become paste-like at higher concentrations. The rheology changes are dependent on the nanowire dimensions. For forming composites as described herein, the silver nanowire dispersions can be as concentrated as practical without having the viscosity too high, which can limit further processing. To dissolve the desired amounts of salts into the dispersions, this also influences the rheology of the dispersions. Volatile solvents are generally used to form the initial silver nanowire dispersion and for the addition of the salt. While other process orders may be suitable, currently the exemplified process order is: 1) forming a good dispersion of the silver nanowires, 2) blending in the silver salt to form a well blended mixture, and 3) adding in the resin components with good mixing. Solvent can optionally be reduced or substantially removed to form a desired ink, assuming that the salt does not precipitate and assuming that a polymer precursor component can function as a suitable solvent/dispersant prior to curing. Thus, liquid resin systems and polymer precursors can also serve as the solvent, and dispersion media.

The initial good silver nanowire dispersion can be formed in a polar solvent, generally with a relatively low boiling point. Suitable solvents include, for example, water, or low molecular weight alcohols, such as methanol, ethanol or isopropyl alcohol. Mixing, such as using commercial mixers, is used to facilitate forming the mixture. Ultrasound sonication for long time periods is generally avoided since it can fragment nanowires, although thicker nanowires can be more tolerant. It can be desirable to avoid use of excessive solvent since time and energy can be expended to remove the solvent. Nevertheless, once a good dispersion is formed, solvent can be removed to concentrate the nanowires.

Applicant's formation and processing to form concentrated nanowire dispersions is described further in the '923 application. The '923 application teaches suitable solvent transfer procedures to provide for forming concentrated silver nanowire dispersions in a wide range of solvents. In summary, the silver nanowires are generally well dispersed in a more dilute dispersion, generally no more than about 10 wt % solids, in a low boiling point solvent, such as ethanol, which is particularly good for forming a good nanowire dispersion. Then, the desired solvent can be blended with the dilute dispersion in a desired amount, and the low boiling solvent is removed, such as using evaporation, with vacuum and/or heat. Applicant has succeeded in dispersing silver nanowires directly into resins as a nonvolatile solvent following removal of an initial low boiling solvent. In general, the solvent used for the nanowire dispersion can be selected to be compatible with respect to solubility of the polymer precursor. Based on forming an initial dispersion at relatively high concentrations and with solvent transfer techniques, good dispersions can be formed for the silver nanowires at high concentrations. These techniques can be readily adapted for the preparing a silver nanowire dispersion at an appropriate concentration and in an appropriate liquid for forming the composite precursor compositions.

For relevant embodiments, the metal (silver) salt is generally dissolved in the silver nanowire dispersion using the liquid dispersant dispersing the silver nanowires. While the salt may be soluble in the polymer precursors solutions, dissolving the salt in the silver nanowire dispersion is generally a more rapid and controllable process generally with available visual confirmation that may nor may not be readily available in the polymer precursor solutions. The amount of metal, such as silver, salt added to the dispersion can be selected to provide the desired ratio of silver nanowires and reduced silver desired for the composite. Appropriate mixing can be used to facilitate dissolving the salt. Additives or a portion thereof may be mixed into the silver nanowire dispersion.

The silver nanowire dispersion can then be mixed with a polymer precursor in the ratio selected to provide the ink composition and the corresponding composite composition. More solvent can be added if desired or solvent can be removed to form the selected ink composition. The polymer precursor composition mixed with the silver nanowire dispersion can comprise monomers, oligomers, liquid polymers, dissolved polymers, optional solvent or mixtures thereof, as indicated above. The components should be compatible so that a homogenous mixture can be formed to allow for forming a good composite material. Generally, if the polymer components are soluble in alcohol, the blend should be appropriately compatible. Following appropriate mixing and solvent adjustment, the ink formulation should be complete.

The ink properties can be adjusted to provide desired properties suitable for a selected deposition process. Since the silver nanowire loading generally is relatively small, the properties of the inks can be heavily dictated by the polymer precursors, with appropriate adjusting of the solvent amounts. Addition or removal of solvent provides a valuable adjustment option to change ink properties. Thus, suitable deposition approaches for the polymer precursors can generally be used for the inks to form the composites, as long as the components are compatible and well mixed. In some embodiments, deposition of the inks can comprise coating, printing or delivery through a nozzle. For inks with paste like properties, screen printing or spreading can be used to deposit the inks. Generally, any reasonable deposition approach can be used. Thus, the polymer selection in the context of the inks, as with the ultimate composite materials, can be controlled by the polymer selection such that the presence of the silver nanowires and salt if present, can be a modest perturbation on the ink properties.

Following deposition of the ink, the deposited composite precursor should be cured to form the composite material. Depending on the deposition approach and solvent presence, some solvent may evaporate during deposition. As noted above, curing can comprise solvent removal, polymerization, crosslinking, reduction of metal, e.g., silver, salts, or combinations thereof. Application of heat may be used to facilitate solvent removal and metal reduction, as well as polymerization, crosslinking or both. Heat can be applied using a heat lamp, heated air or gas blown across the deposit, placement in an oven or combinations thereof. For the reduction of silver salts, heat is generally applied to drive the reduction. The temperature and heating time has been found to be salt dependent as seen in the Examples below. For metal reduction in these materials, generally significantly longer heating time and potentially higher temperatures can be effectively used relative to the fusing process for transparent conductive films. The reason for this difference is not known, but it is suggestive of differences between the two-dimensional and three-dimensional systems. Of course, curing temperatures selected to achieved desired metal reduction can be consistent with polymer processing and stability. Generally, the temperatures are no greater than about 250° C., in further embodiments form about 100° C. to about 240° C., and in some embodiments from about 125° C. to about 225° C. Heating times can be from about 2 minutes (mins) to about 5 hours (hrs), in further embodiments from about 4 mins to about 4 hrs, and in some embodiments from about 5 mins to about 2.5 hrs. A person of ordinary skill in the art will recognize that additional ranges of temperatures and heating times within the explicit ranges above are contemplated and are within the present disclosure. Applicant has been successful at forming fused metal nanostructured networks in transparent films at room temperature, but the present results indicate significant heat being useful to drive silver reduction in the present composite materials. See, published U.S. patent application 2023/0416552 to Yang et al., entitled "Formation of Electrically Conductive Layers at room Temperature Using Silver Nanoparticulate Processing and Inks for Forming the Layers," incorporated herein by reference.

Some desirable polymers incorporated into the composites are UV crosslinkable. The volume fraction of the silver filler along with some effect of the size and shape, influences the depth of UV penetration (transmission vs. extinction). Metal nanowires, with low percolation thresholds, are therefore known to exhibit advantages for UV-cured filled/conductive composites. With significantly lower metal loadings, the composite materials can exhibit significantly greater UV penetration at intensities sufficient to crosslink polymer matrix components. UV curing has been used as a further functionality to facilitate patterning, the ability to UV cure at greater depths in the composites described herein provides the ability to leverage UV curing technology in the patterning context. The ability to achieve desired levels of conductivity at low metal concentration involves deposits of materials that have similar transmission properties and the polymers without the metal loading. Thus, if the polymer is UV crosslinked, a similar thickness of material with the silver nanowires can be similarly crosslinked with the metal loading of the composites herein. Also, at high metal loading, composites are necessarily opaque. The ability to perform UV crosslinking through thicker materials while providing moderately high electrical conductivity is another advantage of the present relatively low metal loading compositions and materials. This ability to UV crosslink thorough a relatively thick deposit of material is a property unique to the new materials described herein.

Generally, for many relevant applications, the deposits of the composite material can have an average thickness of at least a 0.5 microns, in some embodiments at least 5 microns, in further embodiments at least about 10 microns, in additional embodiments from about 12 microns to about 500 microns, and in other embodiments form about 15 microns to about 1 centimeter thick. There generally is no upper limit or lower limit on the thickness, although specific applications suggest appropriate deposit dimensions. Due to the low metal loadings, the composite materials can exhibit optical properties similar to the unloaded polymer material. While the composites are not generally suitable for very low haze, high performance transparent optical films, in some embodiments, the composite materials can be transparent or translucent at reasonable thicknesses.

As noted above, the composite material exhibits properties primarily corresponding to the unloaded polymer with some modification depending on the level of metal loading. The composite material comprises from about 0.10 wt % to about 30 wt % metal, in some embodiments from about 0.20 wt % to about 25 wt %, in further embodiments from about 0.25 wt % to about 20 wt % metal and in other embodiments from about 0.50 wt % to about 17.5 wt % metal, wherein at least about 65 wt % of the metal is silver. The corresponding volume percent of metal depends on the density of the organic components and any optional inorganic additives. Generally, the volume percent ranges from about 0.025 vol % to about 6 vol %, in further embodiments form about 0.05 vol % to about 5 vol %, in some embodiments form about 0.075 vol % to about 4 vol %, and in other embodiments form about 0.1 vol % to about 3 vol %. The metal component is formed primarily from silver nanowires, and while significant aspects of the silver nanowire structure can be reflected in the composite, it is not presently clear how deposited metal, generally silver, and potentially other metal particulates may alter the overall embedded metal structure. Extrapolating from properties of transparent conductive films with fused metal nanostructured networks, deposited metal, e.g., silver, can also improve maintenance of the conductivity under strain. A person or ordinary skill in the art will recognize that additional ranges of metal loading in wt % or vol % within the explicit ranges above are contemplated and are within the present disclosure.

With respect to the organic component of the composite, the organic matrix supporting the electrically conductive composite comprises a majority polymer component. The polymer is generally physically or chemically crosslinked to provide mechanical stability to the composite, and the degree of crosslinking can be designed into the polymer to achieve desired properties, such as Young's modulus, elongation, hardness and the like. The composite generally comprises from about 65 wt % to about 99.75 wt % organics, in further embodiments from about 77.5 wt % to about 99.5 wt %, and in other embodiments from about 80 wt % to about 99.25 wt % organics. The organics in the composite generally comprise from about 85 wt % to 100 wt % polymer, in further embodiments from about 90 wt % to about 99.75 wt % polymer, in other embodiments from about 92.5 wt % to about 99.5 wt %, and in some embodiments from about 94 wt % to about 99 wt % polymer as a fraction of the organics. To the extent that the ink comprises monomers and oligomers, these generally are converted into the polymer matrix during curing. Some non-polymer organics are described above. Viscosity modifiers, UV stabilizers and the like may be carried forward into the cured polymer matrix as dispersed through the matrix. Other non-polymer organic compositions in the inks may react to facilitate the polymerization or crosslinking reactions and may react themselves. So some components of the ink may be reaction products of the ink components, and some volatile reaction products may leave the composite during processing even if the initial compositions were not volatile.

These possibilities are generally known polymer processing features, which are simply carried forward for composite processing based on the nature of the polymer matrix. A person of ordinary skill in the art will recognize that additional ranges of organic and polymer concentrations within the explicit ranges above are contemplated and are within the present disclosure.

The electrical conductivity is found to be a function of several parameters. Applicant's experience with transparent conductive films using fused metal nanostructured networks finds a weak dependence on nanowire length above a certain threshold around 10 microns. Percolation-based electrical conduction scales strongly with NW length and aspect ratios, although for the systems described herein with deposited silver from reductions of ions, the relationships may be more complex. Silver nanowire thickness can influence optical properties of a transparent conductive film, but nanowire thickness in loaded composites has more complicated relationship with properties in which aspect ratio, number density, and overall loading are all relevant factors. The diameter may also have substantial effects on the resistivity depending on the loading (and aspect ratio). As seen in Applicant's current results, in many instances the thicker shorter NWs engender more conductive composites than a composite formed from longer thinner NWs at the same loading. This is somewhat surprising since thicker silver nanowires corresponds with a smaller number of nanowires for a given weight percent, and a larger number of silver nanowires provides the opportunity for a greater number of points of association, which conceptually could improve electrical conductivity. In the other hand, the significant lengths provide longer distance conduction seems to be an important differentiator to provide the low resistivities observed with these materials.

The resistivity is significantly dependent on the amount of reduced and deposited silver within the composite. It is surprisingly observed that the resistivity seems to peak for particular amounts of deposited silver, but it is not known why the resistivity would then increase with further deposited metal. Potentially, in some systems, the additional silver salt adversely impacts the dispersion or nanostructure/microstructure of the nanowire interactions so severely that the resistivity actually increases. Coating images at high silver salt concentrations and coating images with a non-reducible sodium salt, presented in the examples, also show poorer coating properties consistent with disruption of structural features. The amount of reduction of resistivity due to the deposited silver depends on the anion and process conductions. Applicant has previously observed effects of the silver anion on the process conditions to form a fused metal nanostructured network for transparent films. For the present lower metal loading composites, it is not known if further process modifications can more effectively remove differences due to different anions. The amount of reduction of the resistivity is also generally dependent on process conditions with individual process conditions obtained separately for each silver salt. Ranges of effective process conditions are provided above. The resin and polymer matrix materials are also relevant factors.

The resistivity is also dependent on the silver nanowire loading. While this generally is not surprising, what is surprising is that at higher metal nanowire loadings, the effect of the reduced silver deposit becomes gradually less pronounced and ultimately provides little or no improvement at seemingly appropriate loading levels. For the embodiments explored, this silver nanowire concentration effect on reducing the efficacy of the deposited silver from salt is observed for resistivity values above values of lower resistivity obtained with higher loading of silver nanowires, so the improvement from reduced deposited silver ends prior to improvement due to silver nanowire loading improvements. At the other end of the concentration range, as the silver nanowire loading is decreased, an increase in the reduced deposited silver beyond certain amounts also may not result in an improvement in the resistivity and actually may make the material non-conductive. These observations are presumably a clue to the microscopic structure of the new materials, but the clue is not yet interpreted in terms of specific indications of the potential structure. Considering the observations, it seems plausible that the deposited silver helps to form a three dimensional conductive superstructure along a nanowire framework, but this view does not alone necessarily explain some of the surprising nuances of the observations. All of these results though clearly point to a novel materials whose structure will be elucidated over time.

So in summary, the resistivity of the composites decreases with increased silver nanowire loading. Improvement in conductivity based on deposited reduced silver is most effective at loading levels of silver nanowires that are not too low or too high. Therefore, the innovative composite materials seem to provide the most distinctive new properties at relatively low silver nanowire loading with an appropriate amount of deposited reduced silver to achieve lower resistivities that may correspond with resistivities of significantly higher (more than 2×) loadings of silver nanowires if no deposited reduced silver is present. Also, Applicant's general process improvement for handling higher concentrations of silver nanowires allow for forming the higher loading silver nanowire concentrations in the composite materials.

Resistivity is an intensive property that is a function of the material independent of the shape or structure of the material. Bulk silver resistivity is $1.56\times10^{-6}$ Ohm-cm. Resistivity can be determined through measurements of resistance for a particular shaped structure. Resistivity p can be evaluated from the equation $\rho=R\ A/l$, where R is the measured resistance in Ohms, A is the area of the edges of the conductor perpendicular to the conduction path, and l is the length of the conduction path. With respect to resistivity, the composite materials can have a resistivity of no more than about 100 Ohm-cm, in some embodiments no more than about 25 Ohm-cm, in additional embodiments no more than about 10 Ohm-cm, in further embodiments no more than about 5 Ohm-cm, and in some embodiments from about 1 Ohm-cm to about $1.0\times10^{-4}$ Ohm-cm. A person of ordinary skill in the art will recognize that additional ranges of resistivity within the explicit ranges above are contemplated and are within the present disclosure.

The electrically conductive composite materials can be used to form structures to provide electrical connections in context where the polymer properties of the cured material are desirable. Thus, the conductive materials can supply both desired structure features along with providing electrical connectivity.

Due to the ability to obtain relatively low resistivities at low total metal loading, the composites can have qualitative properties essentially aligned with the polymer properties. While compatibility of polymer precursors with the maintenance of a good nanowire dispersion and for appropriate embodiments, dissolving a metal salt, may provide some constraints on polymer precursor selection, a significant range of polymers should be available. The ability to perform UV crosslinking through a relatively thick deposit of composite precursor material can provide for crosslinking to modify conductive composite properties over a broad range of suitable applications. Thus, the conductive composite can have properties ranging from a hard material to a lower modulus material.

EXAMPLES

Materials

L-Nanowires

Silver nanowires referred to as H-nanowires (H-NW) were synthesized in a closed reactor system wherein a heated reaction solution of ethylene glycol (EG), polyvinylpyrrolidone (PVP K30 from BASF) and $NH_4Cl$ was prepared, followed by addition of $AgNO_3$, with continuous stirring for several hours at a temperature of about 160° C. Following completion of the synthesis, the silver nanowires were purified using acetone precipitation, and re-dispersion in water or other solvents. The purified silver nanowires were removed from dispersion, dried, and characterized by transmission electron microscopy as described, for example, in U.S. Pat. No. 10,714,230 to Hu et al. The L-nanowires (L-NW) were prepared with diameters of about 60 nm and had average lengths of about 11 microns. For appropriate embodiments, the L-nanowires were used to prepare the ink compositions described below by initially forming a dispersion or slurry in an alcohol such as ethanol, for example, at a concentration of about 2 wt % to about 10 wt. %. These dispersions were then used to transfer the nanowires to the inks described below involving the evaporative removal of the ethanol using reduced pressure and/or heat.

N-Nanowires

Silver nanowires referred to as N-nanowires (N-NW) were obtained from Applicant C3Nano, Inc. with synthetic procedures described in U.S. Pat. No. 10,714,230 to Hu et al. The N-nanowires had an average diameter of about 20-22 nm and a length of about 20 microns. In appropriate embodiments, the N-nanowires were used to prepare the ink compositions described below by forming a dispersion or slurry in an alcohol such as ethanol, for example, at a concentration of about 2 wt % to about 10 wt. %. These dispersions were then used to transfer the nanowires to the inks described below involving the evaporative removal of the ethanol using reduced pressure and/or heat.

Silver Salts

Silver salts used in the examples are as follows:

- Silver acetate (AgOAc), $Ag(O_2CCH_3)$, from Sigma Aldrich
- Silver trifluoroacetate (AgTFA), $Ag(O_2CCF_3)$ from Beantown Chemical
- Silver heptafluorobutyrate (AgHFB), $Ag(O_2CC_3F_7)$ from Sigma Aldrich
- Silver tetrafluoroborate, $AgBF_4$ from Sigma Aldrich Polymer Binders Organic materials used to prepare polymer binders are as follows:

- N-vinylpyrrolidone (NVP), from Sigma Aldrich
- Trimethylolpropane triacrylate (TMPTA), from Allnex
- Acrylamidomethyl-substituted cellulose ester (JL106E), Jaylink® 106E from Bomar
- Modified urethane acrylate (V80300), Vitralit® 80300 from Panacol-USA, Inc.
- Aliphatic urethane acrylate (NOA85), optical adhesive from Norland Products, Inc.
- Isobornyl acrylate (IBOA)
- N,N-Dimethyl acrylamide (DMAA)
- 2,2,2-Trifluoroethyl methacrylate (TFEMA)
- 3-(Trimethoxysilyl) propyl methacrylate (TMSPMA)
- Photoinitiator (PI), Omnirad 2022 from IGM Resin Preparation of Composites Polymer Binders A-G (precursors) were used to prepare the composites:

| Polymer Binder | Description (Ratios by Weight) |
|---|---|
| PB-A | NVP/TMPTA/PI at 80/20/0.05-5 |
| PB-B | NVP/TMPTA/JL106E at 80/15/5 |
| PB-C | V80300 |
| PB-D | IBOA/DMAA/TFEMA at 4/4/2 |
| PB-E | NOA85 |
| PB-F | NVP/TMPTA/TMSPMA at 75/20/5 |
| PB-G | NVP/TMPTA at 80/20 |

A required (calculated) amount of silver salt was added to a glass vial followed by a required (calculated) amount of a silver nanowire stock dispersion. The ratios of silver salt to silver nanowires indicated in the examples below are each calculated according to a total weight of silver nanowires. Monomer was slowly added dropwise into the glass vial which was then shaken manually to avoid any shock at the interface of the mixture. Mixing was carried out for 10 minutes using a THINKYMIXER (Thinky USA) operating at 1000 rpm, followed by sonicating for 3 minutes at 3000 rpm using vortex mixer. For UV curable monomers, the glass vial was covered with aluminum foil to avoid light exposure even at room temperature. Unless otherwise indicated, no additional components such as solvent were added.

The resulting mixture was coated onto a microscope glass slide using a doctor blade and 25 micron spacers. The coatings were air dried or dried at 65° C. for 5 minutes. The dried coatings were cured by applying UV light at an energy density of 1.8 $J/cm^2$ using a Fusion UV System. Unless otherwise stated, the cured coatings were then baked at 150° C. for 30 minutes followed by cooling to room temperature inside a fume hood. The composites were cooled to room temperature and visually checked for curing and uniformity.

Testing Procedures

Images of the composites were taken at 20× and 50× magnification using an optical microscope. Images were taken in both reflection and transmission modes.

Length, width, and actual thicknesses of the composites were measured using a micrometer. For each composite, the thickness was measured at different locations and the average is reported as the dried film thickness (DFT).

Trace electrodes were formed at two extremities of the resulting composite using Silver Conductor Paste (DuPont™ PE828). Copper foil tape (3M™ Copper Foil Shielding Tape 1182) was also applied onto a surface of the composite to help provide a guide and template for the silver paste. Unless otherwise noted, the samples were then heated at 65° C. for 30 minutes to cure the paste.

Resistances across the lengths of the composites were measured using electronic multimeters FLUKE-287 (9V) or FLUKE-1507 (250V) for resistances in the mega- to giga-Ohms range. The corresponding resistivities were calculated by multiplying by the area of an edge of the conductive strip and dividing the measured resistance by the length of the conductive strip.

An adhesion test was carried out for selected composites. The adhesion test included adhering Scotch® Light Duty Packaging Tape 610 from 3M Co. to the coated side of the sample, and after 60 seconds, removing the tape by grasping the free end of the tape and pulling it off rapidly (not jerked) back upon itself at as close to an angle of 180° as possible.

The amount of coating removed from the substrate was qualitatively evaluated as pass or fail. Pass indicates that no removal of the composite was observed after the tape test and the resistivity remained constant. Fail indicates that the sample did not pass.

Example 1—Effect of Different Silver Salts

Composites having 3 wt % L silver nanowires in Polymer Binder A were prepared with 0 to 20 wt % of different silver salts relative to the silver nanowire weight as shown in Table 1. Resistivities are summarized in Table 1 and shown in FIG. 1.

TABLE 1

| Composite | Amount of Ag Salt to AgNW (wt %) | Resistivity, ρ (Ohm-cm) AgTFA | $AgBF_4$ | AgOAc | AgHFB |
|---|---|---|---|---|---|
| L-PBA-3 | 0 | 8.5 | 5.7 | 5.7 | 5.7 |
| L-PBA-3 | 5 | 0.97 | 18 | 0.62 | 0.34 |
| L-PBA-3 | 10 | 0.011 | 0.43 | 0.22 | 0.028 |
| L-PBA-3 | 15 | 0.056 | 0.048 | 0.16 | 0.021 |
| L-PBA-3 | 20 | 0.024 | 0.027 | 0.032 | 0.0054 |

Composites having 3 wt % L silver nanowires in Polymer Binder A were prepared with different silver salts as shown in Table 2. The % solids was 58% for each composite. Composites were sintered at 150° C. for 30 minutes. Resistivities are summarized in Table 2.

TABLE 2

| Composite | Silver Salt | Amount of Silver Salt to NW (wt %) | Amount of Ag to NW (wt %) | DFT (microns) | Resistivity (Ohm-cm) | Two-Point Resistivity (Ohm) | Adhesion |
|---|---|---|---|---|---|---|---|
| L-PBA-3 | AgTFA | 20 | 10 | 10 | 0.011 | 91 | fail |
| L-PBA-3 | AgHFB | 16.6 | 5.5 | 18 | 0.028 | 42 | fail |
| L-PBA-3 | AgOAc | 43 | 27.5 | 25 | 0.032 | 33 | fail |
| L-PBA-3 | $AgBF_4$ | 45 | 25 | 25 | 0.048 | 42 | fail |

Example 2—Effect of Different Silver Salts and Polymer Binders

Composites having 3 wt % L silver nanowires in Polymer Binder A were prepared with 0 to about 40 wt % of different silver salts as shown in Tables 3-6. The amount of polymer binder was 97 wt % for the composites. The weight percentages of (1) the silver salt relative to weight of the nanowires and (2) silver relative to the weight of the nanowires are included. Dry film thickness (DFT), resistivities, 2-point resistivities and adhesion are summarized in Tables 3-6.

TABLE 3

| Composite | Amount of AgTFA to NW (wt %) | Amount of Ag to NW (wt %) | DFT (microns) | Resistivity (Ohm-cm) |
|---|---|---|---|---|
| L-PBA-3 | 0 | 0 | 5 | 8.5 |
| L-PBA-3 | 10 | 5 | 10 | 0.97 |
| L-PBA-3 | 20 | 10 | 10 | 0.011 |
| L-PBA-3 | 30 | 15 | 10 | 0.056 |
| L-PBA-3 | 40 | 20 | 5 | 0.024 |

TABLE 4

| | Amount of $AgBF_4$ to NW (wt %) | Amount of Ag to NW (wt %) | DFT (microns) | Resistivity (Ohm-cm) |
|---|---|---|---|---|
| L-PBA-3 | 0 | 0 | 5 | 5.7 |
| L-PBA-3 | 10.3 | 5.6 | 20 | 18 |
| L-PBA-3 | 20.5 | 11 | 22 | 0.43 |
| L-PBA-3 | 30.8 | 17 | 20 | 0.63 |
| L-PBA-3 | 41 | 23 | 25 | 0.97 |

TABLE 5

| Composite | Amount of AgOAc to NW (wt %) | Amount of Ag to NW (wt %) | DFT (microns) | Resistivity (Ohm-cm) | Two-Point Resistance (Ohm) |
|---|---|---|---|---|---|
| L-PBA-3 | 0 | 0 | 5 | 5.7 | 12,000 |
| L-PBA-3 | 10.8 | 7 | 21 | 0.62 | 783 |
| L-PBA-3 | 21.5 | 14 | 19 | 0.22 | 293 |
| L-PBA-3 | 32.3 | 15 | 21 | 0.16 | 165 |
| L-PBA-3 | 43 | 28 | 24 | 0.032 | 33 |

TABLE 6

| Composite | Amount of AgHFB to NW (wt %) | Amount of Ag to NW (wt %) | DFT (microns) | Resistivity (Ohm-cm) | Two-Point Resistance (Ohm) |
|---|---|---|---|---|---|
| L-PBA-3 | 0 | 0 | 5 | 5.7 | 12,000 |
| L-PBA-3 | 8.3 | 2.8 | 15 | 0.34 | 610 |
| L-PBA-3 | 16.6 | 5.6 | 18 | 0.028 | 42 |
| L-PBA-3 | 24.9 | 8.4 | 17 | 0.021 | 39 |
| L-PBA-3 | 33.2 | 11.2 | NM[1] | 0.0054 | 16 |

[1]Not measured

Composites having 5 wt % N silver nanowires in Polymer Binder A were prepared with 0 to 20 wt % of AgTFA as shown in Table 7. The % solids on the ink was 30 wt %. The weight percentages of (1) the silver salt relative to weight of the nanowires and (2) silver relative to the weight of the nanowires are included. Dry film thickness (DFT), resistivities, 2-point resistivities and adhesion are summarized in Table 7.

TABLE 7

| Composite | Amount of AgTFA to NW (wt %) | Amount of Ag to NW (wt %) | DFT (microns) | Resistivity (Ohm-cm) | Two-Point Resistance (Ohm) |
|---|---|---|---|---|---|
| N-PBA-5 | 0 | 0 | 8 | 2,780,000 | OL |
| N-PBA-5 | 5 | 2.5 | 11 | 159 | 1000 |
| N-PBA-5 | 10 | 5 | 8.5 | 34.2 | 27,000 |
| N-PBA-5 | 20 | 20 | 8.7 | 268 | 43,000 |

Composites having 20 wt % N silver nanowires (high loading) in Polymer Binder A were prepared with 0 to 20 wt % of AgTFA as shown in Table 8. The % solids was 30 wt %. The weight percentages of (1) the silver salt relative to weight of the nanowires and (2) silver relative to the weight of the nanowires are included. Dry film thickness (DFT), resistivities, 2-point resistivities and adhesion are summarized in Table 8.

TABLE 8

| Composite | Amount of AgTFA to NW (wt %) | Amount of Ag to NW (wt %) | DFT (microns) | Resistivity (Ohm-cm) | Two-Point Resistance (Ohm) |
|---|---|---|---|---|---|
| N-PBA-20 | 0 | 0 | 8 | 0.0942 | 102 |
| N-PBA-20 | 5 | 2.5 | 7 | 0.201 | 300 |
| N-PBA-20 | 10 | 5 | 8 | 7.13 | 70,000 |
| N-PBA-20 | 15 | 7.5 | 7 | 6.07 | 55,000 |
| N-PBA-20 | 20 | 10 | 8 | 8.69 | 37,000 |

Composites having 5 wt % L silver nanowires in Polymer Binder C were prepared with 0 to 40 wt % of AgTFA and AgHFB as shown in Tables 9 and 10, respectively. The weight percentages of (1) the silver salt relative to weight of the nanowires and (2) silver relative to the weight of the nanowires are included. Dry film thickness (DFT), resistivities, 2-point resistivities and adhesion are summarized in Tables 9 and 10.

TABLE 9

| Composite | Amount of AgTFA to NW (wt %) | Amount of Ag to NW (wt %) | DFT (microns) | Resistivity (Ohm-cm) | Two-Point Resistance (Ohm) | Adhesion |
|---|---|---|---|---|---|---|
| L-PBC-5 | 0 | 0 | 10 | 24 | 90,000 | pass |
| L-PBC-5 | 10 | 5 | 8 | 12 | 84,000 | pass |
| L-PBC-5 | 20 | 10 | 10 | 9.5 | 50,100 | pass |
| L-PBC-5 | 30 | 15 | 11 | 2.6 | 12,100 | pass |
| L-PBC-5 | 40 | 20 | 10 | 2.2 | 7700 | pass |

TABLE 10

| Composite | Amount of AgHFB to NW (wt %) | Amount of Ag to NW (wt %) | DFT (microns) | Resistivity (Ohm-cm) | Two-Point Resistance (Ohm) | Adhesion |
|---|---|---|---|---|---|---|
| L-PBC-5 | 0 | 0 | 10 | 24 | 90,000 | pass |
| L-PBC-5 | 8.3 | 2.8 | 12 | 3.2 | 28,000 | pass |
| L-PBC-5 | 16.6 | 5.6 | 13 | 0.35 | 2700 | pass |
| L-PBC-5 | 24.9 | 8.4 | 14 | 0.064 | 254 | pass |
| L-PBC-5 | 33.2 | 11.2 | 9 | 0.039 | 370 | pass |

-

Composites having 3.5 wt % L silver nanowires in Polymer Binder C were prepared with AgTFA at 0 and 40 wt % as shown in Table 11. The weight percentages of (1) the silver salt relative to weight of the nanowires and (2) silver relative to the weight of the nanowires are included. Dry film thickness (DFT), resistivities, 2-point resistivities and adhesion are summarized in Table 11.

TABLE 11

| Composite | Amount of AgTFA to NW (wt %) | Amount of Ag to NW (wt %) | DFT (microns) | Resistivity (Ohm-cm) | Two-Point Resistance (Ohm) | Adhesion |
|---|---|---|---|---|---|---|
| L-PBC-3.5 | 0 | 0 | 5 | 1400 | 7,200,000 | pass |
| L-PBC-3.5 | 40 | 20 | 7 | 460 | 170 | pass |

Figure 2:
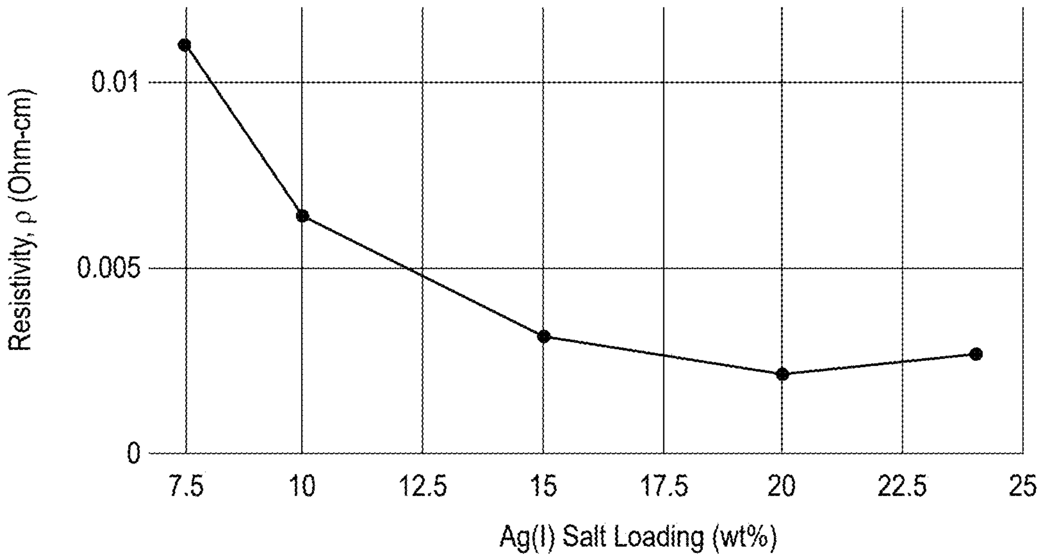
FIG. 2 is a plot of resistivity as a function of the amount of silver trifluoroacetate included in composites with N silver nanowires.

Composites having 3.5 wt % N silver nanowires in Polymer Binder C were prepared with 0 to 48 wt % of AgTFA as shown in Table 8. The % solids was 38%. The amount of polymer binder was 96.5 wt % for the composites. The weight percentages of (1) the silver salt relative to weight of the nanowires and (2) silver relative to the weight of the nanowires are included. Dry film thickness (DFT), resistivities, 2-point resistivities and adhesion are summarized in Table 12. Data for resistivity as a function of AgTFA loading are plotted in FIG. 2.

TABLE 12

| Composite | Amount of AgTFA to NW (wt %) | Amount of Ag to NW (wt %) | DFT (microns) | Resistivity (Ohm-cm) | Two-Point Resistance (Ohm) | Adhesion |
|---|---|---|---|---|---|---|
| N-PBC-3.5 | 0 | 0 | 10 | 5.7 | 10,000 | pass |
| N-PBC-3.5 | 15 | 7.5 | 10 | 0.011 | 32 | pass |
| N-PBC-3.5 | 20 | 10 | 10 | 0.0064 | 35 | pass |
| N-PBC-3.5 | 30 | 15 | 10 | 0.0032 | 15 | pass |
| N-PBC-3.5 | 40 | 20 | 8 | 0.0021 | 12 | pass |
| N-PBC-3.5 | 48 | 24 | 9 | 0.0027 | 11.5 | pass |

Figure 3:
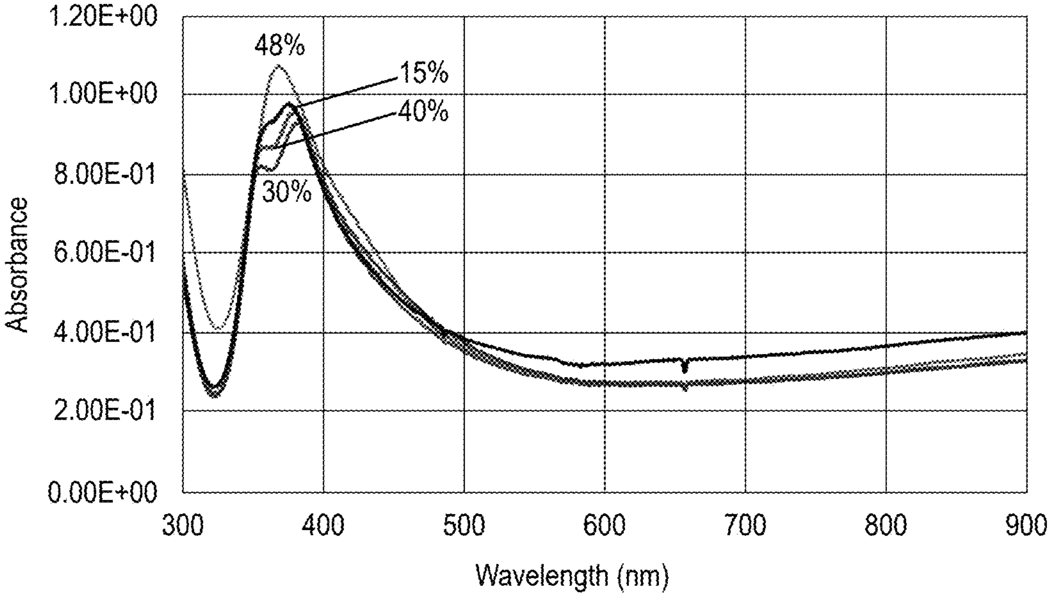
FIG. 3 shows UV-Vis absorption spectra for liquid formulations used to prepare composites with N silver nanowires and silver triflouroacetate.

UV-Vis absorption spectra were obtained for liquid formulations used to prepare four of the composites of Table 12. The spectra are shown in FIG. 3 for liquid formulations including AgTFA at 15, 30, 40 and 48 wt %.

Figure 4A:
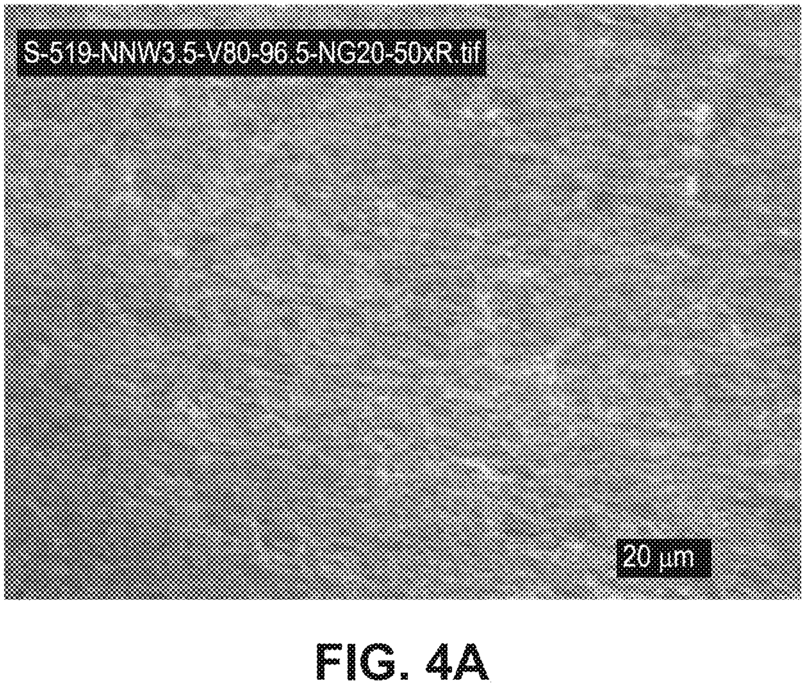
FIGS. 4A and 4B are images at 20× magnification, in reflection and transmission modes, respectively, for a composite prepared with N silver nanowires and silver trifluoroacetate.
Figure 4B:
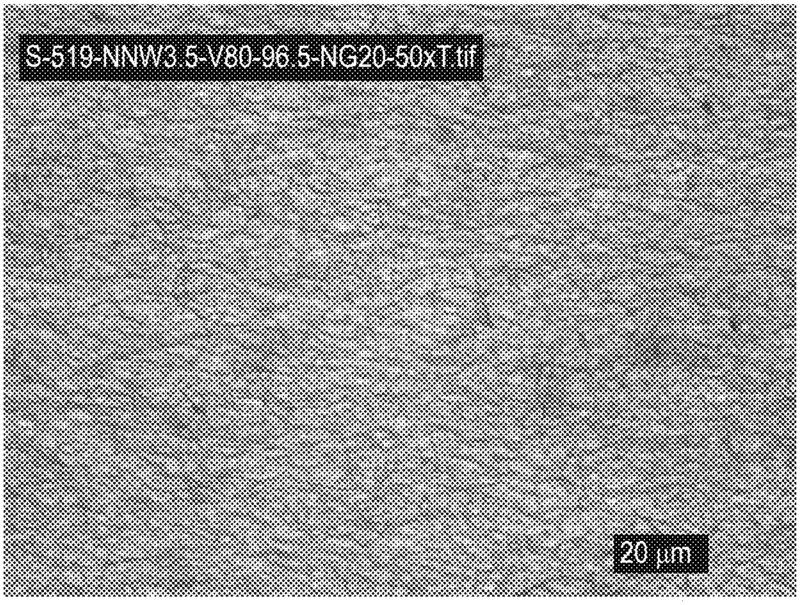
Figure 5A:
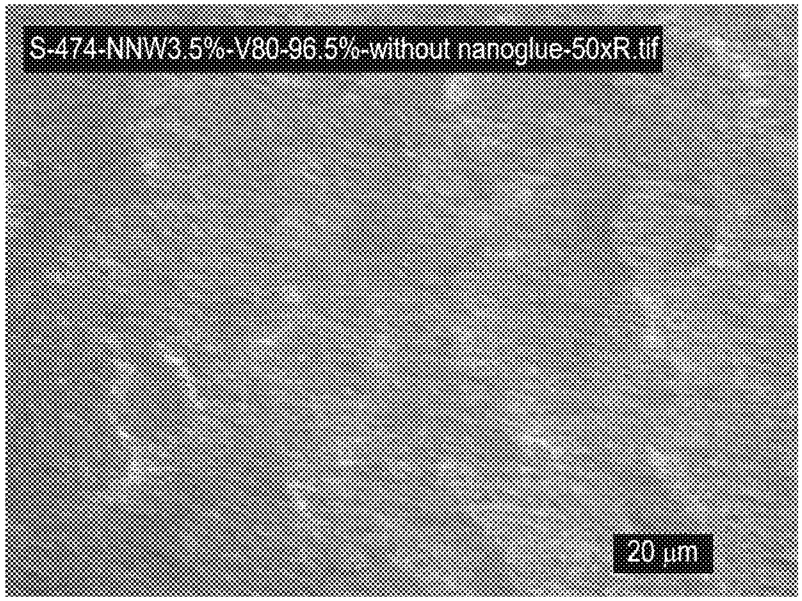
FIGS. 5A and 5B are images at 20× magnification, in reflection and transmission modes, respectively, for a composite prepared with N silver nanowires without silver salt.
Figure 5B:
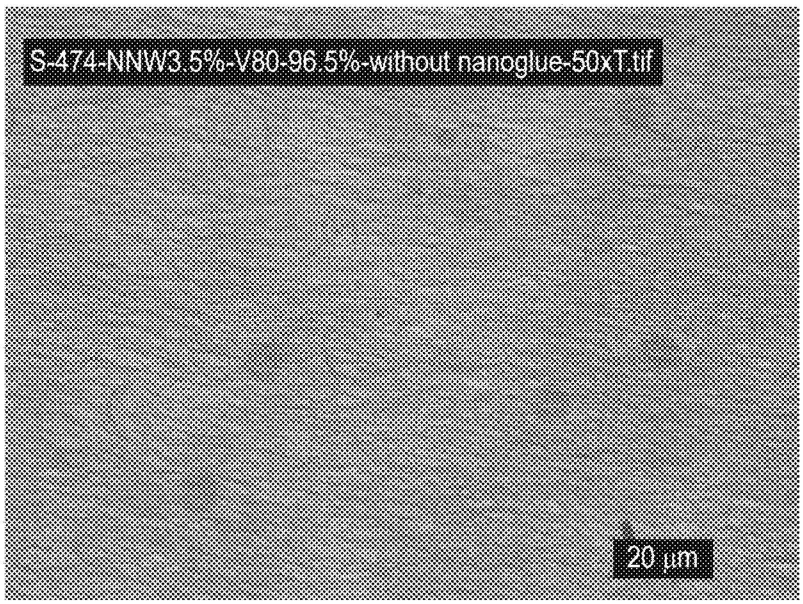

Selected images of N-PBC-3.5,with and without AgTFA, were obtained at 20× in both reflection and transmission modes. FIGS. 4A and 4B show images in reflection and transmission modes, respectively, for the composite with 40 wt % AgTFA. FIGS. 5A and 5B show images in reflection and transmission modes, respectively, for the composite without AgTFA.

Composites having 3 wt % N silver nanowires in Polymer Binder C were prepared with 0 to 10 wt % of AgTFA as shown in Table 13. The % solids was 30%. The weight percentages of (1) the silver salt relative to weight of the nanowires and (2) silver relative to the weight of the nanowires are included. Dry film thickness (DFT), resistivities, 2-point resistivities and adhesion are summarized in Table 13.

TABLE 13

| Composite | Amount of AgTFA to NW (wt %) | Amount of Ag to NW (wt %) | DFT (microns) | Resistivity (Ohm-cm) |
|---|---|---|---|---|
| N-PBC-3 | 0 | 0 | 9 | 20,000 (250 V) |
| N-PBC-3 | 5 | 2.5 | 8 | 90,700 |

Example 3—Effect of Time and Temperature

Figure 6:
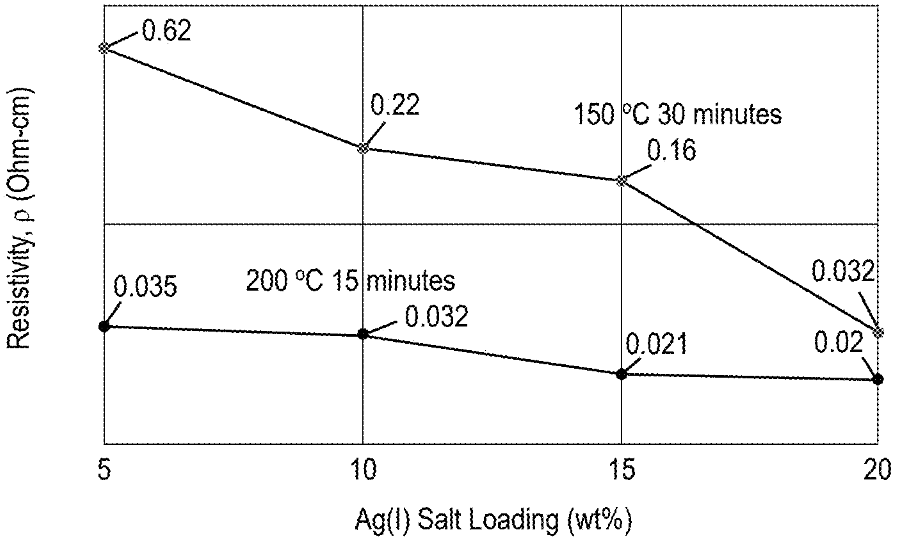
FIG. 6 is a plot of resistivity as a function of the amount of silver acetate included in composites with L silver nanowires wherein the composites were subjected to different times and temperatures.

Composites having 3.5 wt % L silver nanowires in Polymer Binder A were prepared with AgOAc at amounts of 0 to 20 wt % of silver as shown in Table 14. Two composites were prepared for each amount of AgOAc, and one composite was baked at 150° C. for 30 minutes and the other at 200° C. for 15 minutes. Resistivities are summarized in Table 14 and plotted in FIG. 6.

TABLE 14

| Composite | Amount of AgOAc to NW (wt %) | Amount of Ag to NW (wt %) | Resistivity ρ (Ohm-cm) 150° C. for 30 minutes | Resistivity ρ (Ohm-cm) 200° C. for 15 minutes |
|---|---|---|---|---|
| L-PBA-3.5 | 5 | 3.25 | 0.62 | 0.34 |
| L-PBA-3.5 | 10 | 6.5 | 0.22 | 0.028 |
| L-PBA-3.5 | 15 | 9.75 | 0.16 | 0.021 |
| L-PBA-3.5 | 20 | 13 | 0.032 | 0.020 |

Composites having 3.5 wt % L silver nanowires in Polymer Binder C were prepared with 20 wt % of AgTFA. Four composites were prepared and baked at different temperatures and times. Conditions and resistivities are summarized in Table 15.

TABLE 15

| Composite | Amount of AgTFA to NW (wt %) | Amount of AgTFA to Ag (wt %) | Resistivity ρ (Ohm-cm) 65° C. for 30 minutes | Resistivity ρ (Ohm-cm) 120° C. For 30 minutes | Resistivity ρ (Ohm-cm) 150° C. for 30 minutes |
|---|---|---|---|---|---|
| L-PBC-3.5 | 15 | 7.5 | 0.60 | 0.15 | <0.01 |
| L-PBC-3.5 | 20 | 10.75 | 0.60 | 0.14 | <0.01 |
| L-PBC-3.5 | 30 | 15 | 16.5 | 1 | <0.01 |

Example 4—Composites with or without Silver Salt

Composites having N silver nanowires at different amounts in different polymer binders were prepared as shown in Table 16. The % solids ranged from about 30 to about 40 wt %. The cured coatings were baked at 65° C. for 30 minutes. Dry film thickness (DFT), resistivities, 2-point resistivities and adhesion are summarized in Table 16.

TABLE 16

| Composite | N-NW Loading (wt %) | DFT (microns) | Resistivity (Ohm-cm) | Two-Point Resistance (Ohm) | Adhesion |
|---|---|---|---|---|---|
| N-PBD-4 | 4 | 13 | 14200 | 88,000,000 | pass |
| N-PBD-5 | 5 | 10 | 3600 | 36,000,000 | pass |

TABLE 16-continued

| Composite | N-NW Loading (wt %) | DFT (microns) | Resistivity (Ohm-cm) | Two-Point Resistance (Ohm) | Adhesion |
|---|---|---|---|---|---|
| N-PBC-5 | 5 | 15 | 1200 | 1,000,000 | pass |
| N-PBC-3.5 | 3.5 | 9 | 1400 | 7,200,000 | pass |
| N-PBE-5 | 5 | 15 | 1.06 | 10,000 | pass |
| N-PBE-3.5 | 3.5 | 6 | 3200 | 1,200,000 | pass |

Composites having L silver nanowires at different amounts in different polymer binders were prepared as shown in Table 17. The % solids ranged from about 46 to about 66 wt %. The cured coatings were baked at 65° C. for 30 minutes. Dry film thickness (DFT), resistivities, 2-point resistivities and adhesion are summarized in Table 17.

TABLE 17

| Composite | L-NW Loading (wt %) | DFT (microns) | Resistivity (Ohm-cm) | Two-Point Resistance (Ohm) | Adhesion |
|---|---|---|---|---|---|
| L-PBA-4.5 | 4.5 | 8 | 18 | 7000 | fail |
| L-PBA-3 | 3 | 10 | 8.5 | 12,000 | fail |
| L-PBF-4.5 | 4.5 | 10 | 1.6 | 310 | pass |
| L-PBF-3 | 3 | 10 | 74 | 7000 | pass |
| L-PBF-2 | 2 | 8 | — | OL[1] | — |
| L-PBG-2 | 2 | 12 | — | OL[1] | — |

[1]outside limit of measurement, no voltage applied, percolation point

Composites having L silver nanowires at different amounts in PB-F and PB-B were prepared as shown in Table 18. Two composites were prepared for each amount of L silver nanowires: one composite did not include silver salt and the cured coating was baked at 65° C. for 30 minutes, and the other composite included AgTFA at 20 wt % and the cured coating was baked at 150° C. for 30 minutes. Dry film thickness (DFT) and resistivities are summarized in Table 18.

TABLE 18

| Composite | L-NW Loading (wt %) | DFT (microns) | Resistivity, ρ (Ohm-cm) Without Silver Salt | With 10 wt % Ag to NW[1] |
|---|---|---|---|---|
| L-PBF- | 50 | 15 | 0.00023 | NM[2] |
| L-PBF-40 | 40 | 35 | 0.0017 | NM[2] |
| L-PBF-20 | 20 | 20 | 0.0066 | NM[2] |
| L-PBF-10 | 10 | 25 | 0.35 | NM[2] |
| L-PBB-5 | 5 | 10 | 70 | 1.5 |
| L-PBB-3 | 3 | 30 | 920 | 0.46 |
| L-PBB-2 | 2 | 30 | 5800 | 64 |
| L-PBB-1 | 1 | 70 | 5500 | >100,000 |
| L-PBB-0.5 | 0.5 | 130 | 840,000 | >100,000 |

[1]AgTFA added at 20 wt % to Ag NW

[2]Not measured.

Figure 7:
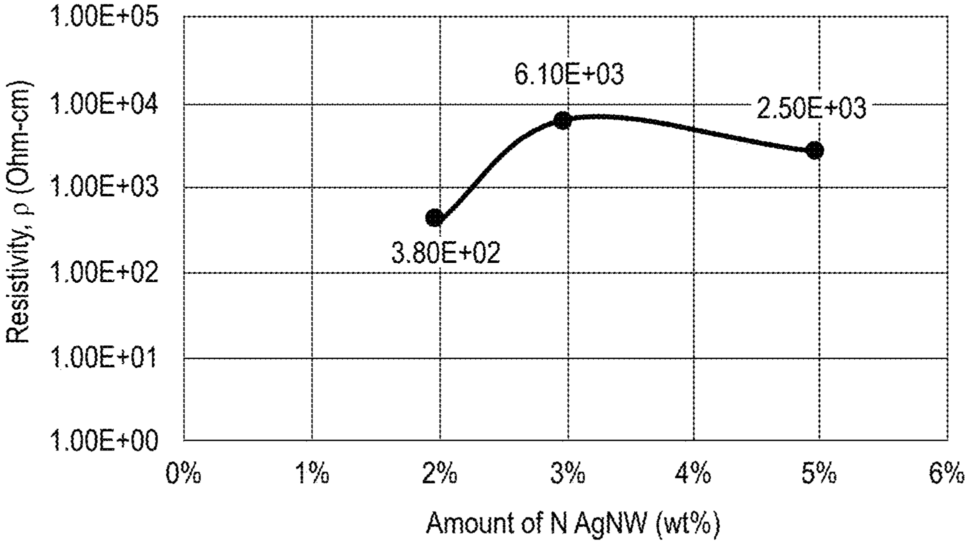
FIG. 7 is a plot of resistivity as a function of weight percent of N silver nanowires included in composites with 10 wt % silver trifluoroacetate.

Composites having N silver nanowires at different amounts in PB-B were prepared as shown in Table 19. Two composites were prepared for each amount of N silver nanowires: one composite did not include silver salt and the other composite included AgTFA at 10 wt %. Both composites were baked at 65° C. for 30 minutes. Dry film thickness (DFT) and resistivities are summarized in Table 19 and shown in FIG. 7.

TABLE 19

| Composite | N-NW Loading (wt %) | DFT (microns) | Without Silver Salt | With 5 wt % Ag to NW[1] |
|---|---|---|---|---|
| N-PBB-10[2] | 10 | — | — | — |
| N-PBB-5 | 5 | 20-30 | 2500 | 290 |
| N-PBB-3 | 3 | 30 | 6100 | 400 |
| N-PBB-2 | 2 | 10-20 | 380 | 17 |

[1]AgTFA added at 10 wt % to Ag NW

[2]Viscosity high and dispersion quality deteriorated

Example 5—Composites with Non-Silver Salt

Composites having 3 wt % L silver nanowires in Polymer Binder A were prepared with 0 to about 60 wt % of NaTFA as shown in Table 20. Dry film thickness (DFT), resistivities, 2-point resistivities and adhesion are summarized in Tables 20. For comparison, data for a composite having AgTFA instead of NaTFA are included in Table 20.

TABLE 20

| Composite | Amount of NaTFA to NW (wt %) | Amount of Na (wt %) | DFT (microns) | Resistivity (Ohm-cm) | Two-Point Resistance (Ohm) | Adhesion |
|---|---|---|---|---|---|---|
| L-PBA-3 | 0 | 0 | 10 | 85 | 90,000 | fail |
| L-PBA-3 | 20 | 3.4 | 12 | OL[1] | OL[1] | NA |
| L-PBA-3 | 60 | 10.2 | 10 | OL[1] | OL[1] | NA |
| L-PBA-3 | 20 (AgTFA) | 10 (Ag) | 10 | 0.11 | 9.1 | fail |

[1]outside limit of measurement, no voltage applied, percolation point

Figure 9:
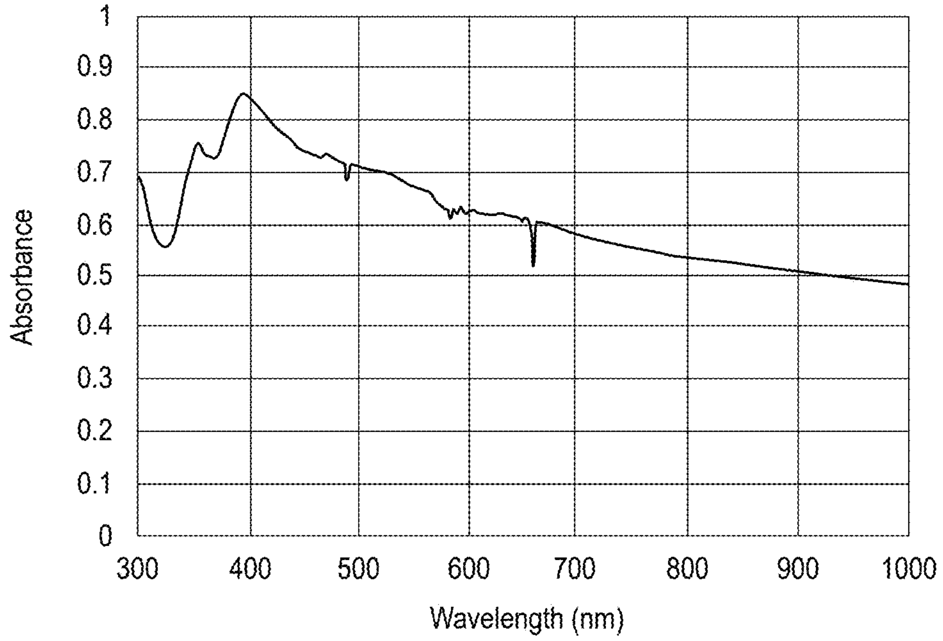
FIG. 9 shows UV-Vis extinction spectrum for liquid formulation used to prepare a composite with L silver nanowires and 20 wt % sodium triflouroacetate.

UV-Vis absorption spectrum for the liquid formulation used to prepare the composite with 20 wt % NaTFA is shown in FIG. 9.

Figure 8A:
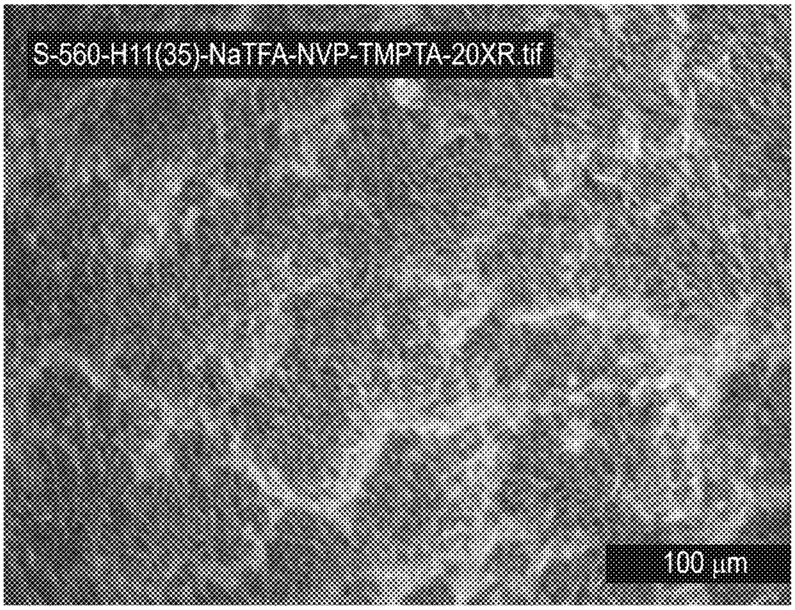
FIGS. 8A and 8B are images at 20× magnification, in reflection and transmission modes, respectively, for a composite prepared with L silver nanowires and 20 wt % sodium trifluoroacetate.
Figure 8B:
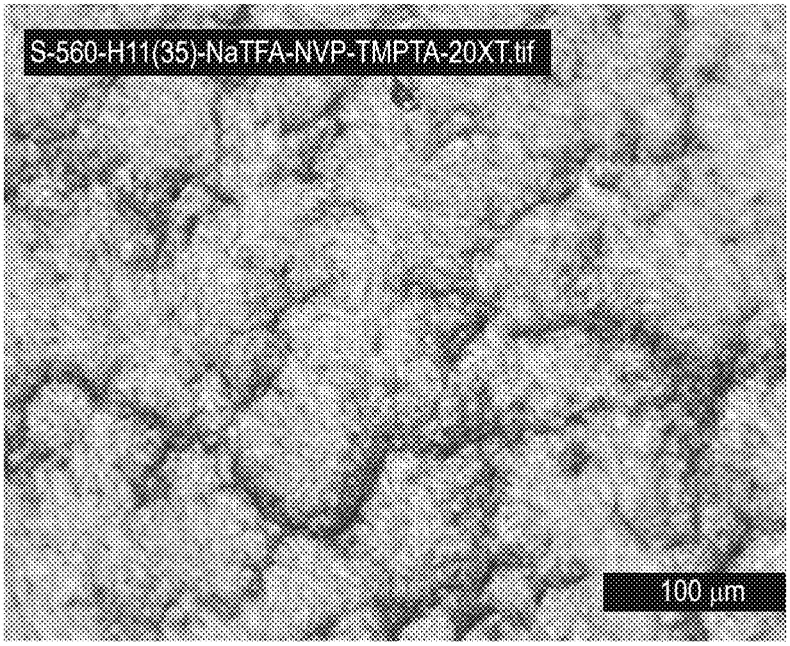

Images of the composite with 20 wt % NaTFA obtained at 20× in both reflection and transmission modes are shown in FIGS. 8A and 8B, respectively.

Example 6—Reliability

Figure 10:
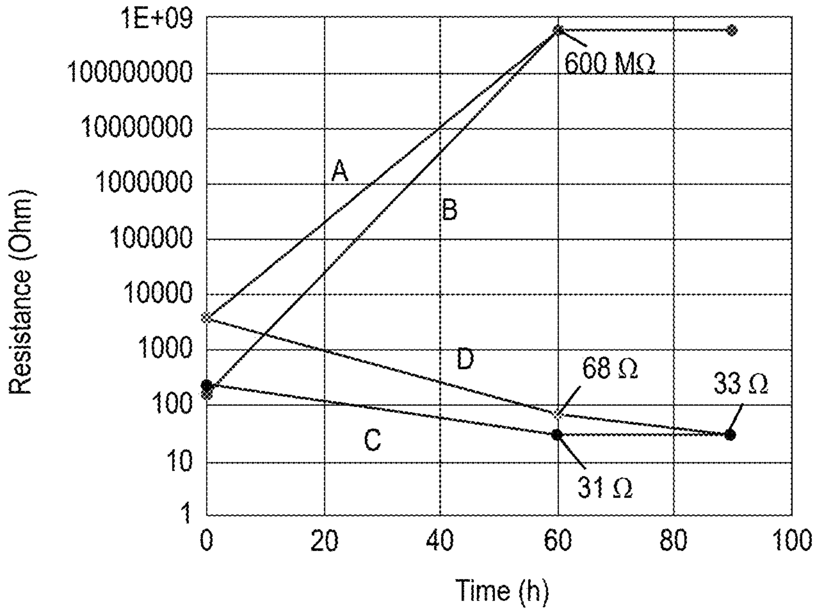
FIG. 10 is a plot of resistance versus time for composites prepared with L silver nanowires with and without silver heptafluorobutyrate and stored in an environment of 85° C. at 85% humidity for up to 4 days.

Composites having 5 wt % L silver nanowires in Polymer Binders A and C were prepared with 0 to about 20 wt % of AgHFB as shown in Table 21. The composites were subjected to reliability testing by storing in an environment of 85° C. at 85% humidity and measuring resistance at times 0, 3 days and 4 days. Results are summarized in Table 21 and shown in FIG. 10.

TABLE 21

| Sample | Composite | Amount of Ag to NW (wt %) | Resistance (Ohm) Time = 0 | Time = 3 days | Time = 4 days |
|---|---|---|---|---|---|
| A | L-PBC-5 | 0 | 3400 | 600,000,000 | 600,000,000 |
| B | L-PBC-5 | 10 | 152 | 600,000,000 | 600,000,000 |
| C | L-PBC-5 | 15 | 220 | 31 | 31 |
| D | L-PBA-5 | 20 | 3500 | 68 | 33 |

Further Inventive Concepts

1. A method for forming the curable ink composition of claim 1, the method comprising: blending a dispersion of silver nanowires in a liquid resin with a soluble silver salt.

A1. An electrically conductive structure having a thickness of at least about 0.51 microns and comprising a composite material having a resistivity of no more than about 500 Ohm-cm and comprising at least about 60 wt % polymer and from about 0.5 wt % to about 40 wt % silver.

A2. The electrically conductive structure of inventive concept A1 having a resistivity of no more than about 100 Ohm-cm.

A3. The electrically conductive structure of inventive concept A1 having a resistivity of no more than about 1 Ohm-cm.

A4. The electrically conductive structure of inventive concept A1 having a thickness of from about 0.51 microns to about 50 microns.

A5. The electrically conductive structure of inventive concept A1 wherein the electrically conductive structure is opaque.

A6. The electrically conductive structure of inventive concept A1 wherein the electrically conductive structure is translucent.

A7. The electrically conductive structure of inventive concept A1 wherein the electrically conductive structure has a total transmittance of visible light of at least about 80%.

A8. The electrically conductive structure of inventive concept A1 wherein the polymer comprises chemically crosslinked polymer.

A9. The electrically conductive structure of inventive concept A8 wherein the polymer comprises a (meth) acrylate.

A10. The electrically conductive structure of inventive concept A1 wherein the silver forms a silver component that comprises silver nanowire segments and reduced silver deposits.

A11. The electrically conductive structure of inventive concept A10 wherein the silver is organized in a thermodynamically driven conductive network.

A12. The electrically conductive structure of inventive concept A10 wherein the silver component is formed from about 0.25 wt % to about 25 wt % silver nanowires, and from about 5 wt % to about 50 wt % reducible metal ions relative to the weight of the silver nanowires.

A13. The electrically conductive structure of inventive concepts A12 wherein the silver nanowires have an average length of at least about 7 microns.

A14. The electrically conductive structure of inventive concept A1 comprising at least about 70 wt % polymer.

A15. The electrically conductive structure of inventive concept A1 having a resistivity of no more than about 100 Ohm-cm.

A16. The electrically conductive structure of inventive concept A1 having a resistivity of no more than about 1 Ohm-cm.

A17. The electrically conductive structure of inventive concept A1 having an average thickness from about 5 microns to about 1 centimeter.

A18. The electrically conductive structure of inventive concept A1 comprising at least about 75 wt % polymer and a silver component formed from about 0.5 wt % to about 15 wt % silver nanowires, and from about 2 wt % to about 25 wt % reducible metal ions relative to the weight of the silver nanowires.

B1. A composite material comprising at least about 70 wt % polymer and metal formed from curing about 1.0 wt % to about 25 wt % silver nanowires and from about 2% to about 50% reduced metal relative to weight of silver nanowires.

B2. The composite material of inventive concept B1 wherein the silver nanowires have an average diameter less than about 100 nm.

B3. The composite material of inventive concept B1 wherein the silver nanowires have an average diameter less than about 25 nm.

B4. The composite material of inventive concept B1 wherein the silver nanowires have an average diameter from about 50 nm to about 100 nm and an aspect ratio of from about 50 to about 500.

B5. The composite material of inventive concept B1 wherein the silver nanowires have an average diameter less than about 25 nm and an aspect ratio of from about 500 to about 2000.

B6. The composite material of inventive concept B1 comprising from about 1 wt % to about 15 wt % silver nanowires.

B7. The composite material of inventive concept B1 comprising from about 1 wt % to about 10 wt % silver nanowires.

B8. The composite material of inventive concept B1 comprising from about 1 wt % to about 5 wt % silver nanowires.

B9. The composite material of inventive concept B1 wherein the reduced metal comprises silver.

B10. The composite material of inventive concept B6 wherein the reduced metal comprises silver and the composite material comprises no more than about 20 wt % total amount of silver.

B11. The composite material of inventive concept B7 wherein the reduced metal comprises silver and the composite material comprises no more than about 15 wt % total amount of silver.

B12. The composite material of inventive concept B8 wherein the reduced metal comprises silver and the composite material comprises no more than about 8 wt % total amount of silver.

B13. The composite material of inventive concept B1 comprising from about 2% to about 25% reduced metal relative to weight of the silver nanowires.

B14. The composite material of inventive concept B1 wherein the composite material is insoluble in an organic solvent at room temperature.

B15. The composite material of inventive concept B1 wherein the composite material is soluble or partially soluble in an organic solvent at room temperature.

B16. The composite material of inventive concept B1 wherein the polymer comprises a chemically crosslinked polymer.

B17. The composite material of inventive concept B1 wherein the polymer comprises a physically crosslinked polymer binder.

B18. The composite material of inventive concept B1 wherein the polymer comprises a combination of physically crosslinked polymer and chemically crosslinked polymer.

B19. The composite material of inventive concept B1 wherein the polymer comprises a (meth)acrylate polymer, a urethane polymer, an epoxy-based polymer, a silicone polymer, a blend thereof, or a copolymer thereof.

B20. The composite material of inventive concept B1 wherein the polymer comprises a (meth)acrylate.

B21. The composite material of inventive concept B1 wherein the polymer comprises a urethane acrylate.

B22. The composite material of inventive concept B1 wherein the polymer comprises an acrylate-acrylamide copolymer.

B23. The composite material of inventive concept B1 comprising at least about 95 wt % polymer.

B24. The composite material of inventive concept B1 wherein the composite material is adhesive.

B25. The composite material of inventive concept B1 further comprising a colorant, an antioxidant, a corrosion inhibitor or a combination thereof.

C1. A method of forming an electrically conductive composite material, the method comprising:

curing a precursor blend of polymer matrix precursor, silver nanowires, and dissolved silver salt, wherein the solid component of the blend comprises from about 0.5 wt % to about 25 wt % silver nanowires, wherein curing comprises reducing the dissolved silver salt to form a composite material with a resistivity of no more than about 500 Ohm-cm.

C2. The method of inventive concept C1 wherein curing comprises heating the precursor blend at a temperature and time to chemically and/or physically crosslinks the polymer matrix precursor.

C3. The method of inventive concept C1 wherein curing comprises heating the precursor blend at a temperature of from about 65° C. to about 200° C. for at least about 15 minutes.

C4. The method of inventive concept C3 wherein heating facilitates reduction of metal salts to form reduced metal in the composite material.

C5. The method of inventive concept C3 wherein the precursor blend further comprises a thermal initiator.

C6. The method of inventive concept C1 wherein curing comprises applying UV radiation to chemically crosslink the polymer matrix precursor.

C7. The method of inventive concept C6 wherein the precursor blend further comprises a photoinitiator.

C8. The method of inventive concept C1 wherein the precursor blend further comprises solvent, and curing comprises removing solvent from the blend.

C9. The method of inventive concept C1 further comprising:

forming a precursor blend of polymer matrix precursor, silver nanowires, and dissolved silver salt, wherein the precursor blend forms a curable ink.

C10. The method of inventive concept C9 wherein the forming comprises blending in a mechanical mixer.

C11. The method of inventive concept C9, wherein a solid component of the precursor blend comprises from about 1 wt % to about 15 wt % silver nanowires and from about 2% to about 25% reducible metal ions relative to weight of the silver nanowires.

C12. The method of inventive concept C1 further comprising:

depositing the precursor blend, wherein the curing forms an electrically conductive material.

C13. The method of inventive concept C12 wherein depositing comprises coating, printing or delivering the precursor blend through a nozzle.

C14. The method of inventive concept C1 wherein the polymer matrix precursor comprises a (meth)acrylate.

C15. The method of inventive concept C10 wherein the electrically conductive material forms the electrically conductive structure of any one of inventive concepts A1-A18.

D1. A composite material comprising from about 0.25 wt % to about 25 wt % silver, and at least about 70 wt % polymer, wherein the composite material has a resistivity of no more than about 500 Ohm-cm and wherein the silver is in a conductive structure comprising a randomly organized, thermodynamically assembled metallic structure with portions having a nanowire segment and reduced metal deposits.

D2. The composite material of inventive concept D1 having a resistivity of no more than about 100 Ohm-cm.

D3. The composite material of inventive concept D1 having a resistivity of no more than about 1 Ohm-cm.

D4. The composite material of inventive concept D1 comprising from about 0.5 wt % to about 15 wt % silver.

D5. The composite material of inventive concept D1 comprising from about 0.5 wt % to about 5 wt % silver.

D6. The composite material of inventive concept D1 wherein the silver is formed from silver sources comprising silver nanowires and from about 0.5 wt % to about 50 wt % reduced silver relative to the weight of the silver nanowires.

D7. The composite material of inventive concept D1 wherein the polymer is chemically crosslinked.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated. The use of the term "about" herein refers to expected uncertainties in the associated values as would be understood in the particular context by a person of ordinary skill in the art.

What is claimed is:

1. A curable ink composition comprising a flowable blend comprising at least about 72.5 wt % polymer matrix precursor, from about 0.25 wt % to about 25 wt % silver nanowires, and from about 5 wt % to about 50 wt % reducible metal ions relative to the weight of the silver nanowires, wherein the reducible metal ions comprise silver, platinum, gold or palladium ions.

2. The curable ink composition of claim 1 further comprising at least about 5 wt % of a volatile solvent.

3. The curable ink composition of claim 2 wherein the volatile solvent comprises water, alcohols, glycols, amides, glycol ethers, polar aprotic solvent, or a mixture thereof.

4. The curable ink composition of claim 1 wherein the ink is substantially free of volatile solvent.

5. The curable ink composition of claim 1 wherein the reducible metal ions comprise silver ions.

6. The curable ink composition of claim 5 wherein the silver ions are present as silver acetate, silver trifluoroacetate, silver tetrafluoroborate, silver heptafluorobutyrate or a combination thereof.

7. The curable ink composition of claim 1 wherein the polymer matrix precursor comprises a (meth)acrylate monomer.

8. The curable ink composition of claim 1 wherein the polymer matrix precursor comprises a monomer having hydroxyl functional groups, a monomer comprising epoxy functional groups, a monomer comprising isocyanate functional groups, or mixtures thereof.

9. The curable ink composition of claim 1 wherein the polymer matrix precursor comprises a fluorinated aliphatic (meth)acrylate monomer, an aliphatic urethane acrylate monomer and an aliphatic (meth)acrylate monomer, an aliphatic urethane acrylate monomer having one or more terminal hydroxy groups, an aliphatic urethane acrylate monomer having one or more terminal epoxy groups, or a mixture thereof.

10. The curable ink composition of claim 1 wherein the polymer matrix precursor comprises an aliphatic ether having one or more epoxy groups; an acid anhydride and a monomer comprising one or more terminal epoxy groups; an acid anhydride and a monomer comprising bisphenol A and one or more terminal epoxy groups; an acid anhydride and a monomer comprising hydrogenated bisphenol A and one or more terminal epoxy groups; or a mixture thereof.

11. The curable ink composition of claim 1 wherein the polymer matrix precursor is chemically crosslinkable.

12. The curable ink composition of claim 1 wherein the polymer matrix precursor is physically crosslinkable.

13. The curable ink composition of claim 1 wherein the polymer matrix precursor is chemically and physically crosslinkable.

14. The curable ink composition of claim 1 wherein the polymer matrix precursor is thermally curable.

15. The curable ink composition of claim 1 wherein the polymer matrix precursor is UV curable.

16. The curable ink composition of claim 1 further comprising a UV initiator.

17. The curable ink composition of claim 1 further comprising a surfactant.

18. The curable ink composition of claim 1 comprising at least about 80 wt % polymer matrix precursor and from about 0.5 wt % to about 15 wt % silver nanowires.

19. The curable ink composition of claim 1 comprising at least about 85 wt % polymer matrix precursor, from about 0.5 wt % to about 10 wt % silver nanowires, and from about 10 wt % to about 30 wt % reducible metal ions relative to the weight of the silver nanowires.

20. The curable ink composition of claim 19 wherein the curable ink composition can be chemically crosslinked using reactions driven thermally and/or with radiation.

21. The curable ink composition of claim 1 further comprising no more than about 20 wt % non-nanowire silver particulates relative to a total metal weight of the ink.

* * * * *